US012604154B2

(12) United States Patent (10) Patent No.: US 12,604,154 B2

Hashimoto et al. (45) Date of Patent: Apr. 14, 2026

(54) INFORMATION PROVISION DEVICE, INFORMATION PROVISION SYSTEM, INFORMATION PROVISION METHOD, AND PROGRAM

(71) Applicant: NEC Corporation, Tokyo (JP)

(72) Inventors: Yuki Hashimoto, Tokyo (JP); Goh Shibata, Tokyo (JP); Takayuki Sasaki, Tokyo (JP)

(73) Assignee: NEC CORPORATION, Tokyo (JP)

( * ) Notice: Subject to any disclaimer, the term of this patent is extended or adjusted under 35 U.S.C. 154(b) by 307 days.

(21) Appl. No.: 18/198,463

(22) Filed: May 17, 2023

(65) Prior Publication Data

US 2023/0388740 A1     Nov. 30, 2023

(30) Foreign Application Priority Data

May 24, 2022     (JP) ................................. 2022-084333

(51) Int. Cl.
H04W 4/021     (2018.01)
H04W 4/02     (2018.01)
H04W 4/024     (2018.01)

(52) U.S. Cl.
CPC ........... H04W 4/021 (2013.01); H04W 4/024 (2018.02); H04W 4/027 (2013.01)

(58) Field of Classification Search
CPC ..... H04W 4/021; H04W 4/029; H04W 4/027; H04W 4/40; H04W 4/02; H04W 4/023; H04W 4/022; H04W 4/44; H04W 4/80; H04W 4/90; H04W 4/46; H04W 64/00; H04W 4/024; H04W 4/025; H04W 4/026; H04W 4/38; H04W 4/14; H04W 4/70;

H04W 8/14; H04W 92/08; H04W 64/006; H04W 76/50; H04W 12/63; H04W 4/21; H04W 92/18; H04W 40/244; H04W 52/0251; H04W 40/20; H04W 4/50; H04W 68/00; H04W 8/18; H04W 4/08; H04W 48/04; H04W 52/0209; H04W 88/02; H04W 12/64; H04W 72/40; H04W 52/0229; H04W 60/04; H04W 36/324; H04W 84/005; G06Q 10/0833; G06Q 30/0261; G06F 16/29; G01S 13/931; G01S 19/42; G01S 13/04; G01S 17/931; G01S 19/51; G01S 7/415; G01S 13/56; G01S 13/58; G01S 19/52; G01S 5/0294;

(Continued)

(56) References Cited

U.S. PATENT DOCUMENTS

| 9,841,286 B1 * | 12/2017 | Hayward | ............... B60K 35/10 |
| 9,841,767 B1 * | 12/2017 | Hayward | ............. B60W 40/10 |
| 9,870,649 B1 * | 1/2018 | Fields | .................... G08G 1/162 |

FOREIGN PATENT DOCUMENTS

WO     2016/194117 A1     12/2016

* cited by examiner

*Primary Examiner* — Alison Slater
*Assistant Examiner* — Jing Gao
(74) *Attorney, Agent, or Firm* — Sughrue Mion, PLLC

(57) ABSTRACT

A method and an apparatus for providing information is provided. The method includes acquiring first positional information of a moving body, acquiring second positional information of a user, obtaining positional relationship information based on the first positional information and the second positional information, and based on a distance between the moving body and the user, providing a first notification based on the positional relationship information.

17 Claims, 34 Drawing Sheets

(58) Field of Classification Search
CPC ...... G01S 2205/09; G01S 15/58; G01S 17/58;
G01S 19/05; G01S 19/17; G01S 13/46
See application file for complete search history.

| MOVEMENT SPEED THRESHOLD VALUE | GF ARRANGEMENT | GF DEFINITION | GF DISTANCE |
|---|---|---|---|
| SPEED OF EQUAL TO OR MORE THAN 10 km PER HOUR | FRONT SIDE | RADIUS $r_1$, NUMBER $n$ | $d_1$ |
| SPEED OF LESS THAN 10 km PER HOUR | FRONT SIDE AND LATERAL SIDE | RADIUS $r_2$, NUMBER $m$ | $d_2$ |
| SPEED OF 0 km PER HOUR | ALL AROUND | RADIUS $r_3$, NUMBER $l$ | $d_3$ |

Fig. 8

| MOVEMENT SPEED THRESHOLD VALUE | CONTENT CLASSIFICATION |
|---|---|
| SPEED OF EQUAL TO OR MORE THAN 10 km PER HOUR | CONTENT A |
| SPEED OF LESS THAN 10 km PER HOUR | CONTENT B |
| SPEED OF 0 km PER HOUR | CONTENT C |

Fig. 9

| RELATIVE ANGLE THRESHOLD VALUE | CONTENT CLASSIFICATION |
|---|---|
| 0°～120° | CONTENT A (FOR RIGHT) |
| 121°～240° | CONTENT B (FOR WARNING) |
| 241°～360° | CONTENT C (FOR LEFT) |

Fig. 10

| TIME PERIOD | ADJUSTMENT VALUE |
|---|---|
| 0 : 00~7:00 | a |
| 7 : 00~11:00 | b |
| 11 : 00~16:00 | c |
| 16 : 00~20:00 | d |
| 20 : 00~24:00 | e |

Fig. 31

| GEOFENCE IN ADVANCE | CURRENT GEOFENCE | CONTENT CLASSIFICATION |
|---|---|---|
| G1 | G3 | A |
| G2 | G3 | B |

Fig. 34

| OUTSIDE OR IN ANGLE THRESHOLD VALUE IN GEOFENCE IN ADVANCE | OUTSIDE OR IN ANGLE THRESHOLD VALUE IN CURRENT GEOFENCE | CONTENT CLASSIFICATION |
|---|---|---|
| OUTSIDE ANGLE THRESHOLD VALUE IN GF2 | IN ANGLE THRESHOLD VALUE IN GF3 | C |
| IN ANGLE THRESHOLD VALUE IN GF2 | IN ANGLE THRESHOLD VALUE IN GF3 | D |

INFORMATION PROVISION DEVICE, INFORMATION PROVISION SYSTEM, INFORMATION PROVISION METHOD, AND PROGRAM

INCORPORATION BY REFERENCE

This application is based upon and claims the benefit of priority from Japanese patent application No. 2022-084333, filed on May 24, 2022, the disclosure of which is incorporated herein in its entirety by reference.

TECHNICAL FIELD

The present disclosure relates to an information provision device, an information provision system, an information provision method, and a program.

BACKGROUND ART

In recent years, a service using positional information called a geofence has started due to a spread of a communication device such as a smartphone. The geofence is an area surrounded by a virtual fence (boundary line) provided on a map. By setting such a geofence, information about a shop, such as an advertisement and a coupon, is provided from a shop and the like in the geofence to a user terminal possessed by a user who enters the fence.

For example, Patent Literature 1 describes that a management server provides event information about a facility to a movement terminal device in response to a request from the movement terminal device. Furthermore, Patent Literature 1 describes that a geofence boundary line is dynamically created when the movement terminal device moves in a path.

[Patent Literature 1] International Patent Publication No. WO2016/194117

A conventional technique intends to provide information about a facility being real estate to a movement terminal device possessed by a user. Thus, a geofence, a region, or the like for providing, to a user, information about a moving body such as a kitchen car that moves and stops during service provision cannot be appropriately set.

SUMMARY

The present disclosure has been made in order to solve such a problem, and an example object of the present disclosure is to provide an information provision device, an information provision system, an information provision method, and a program that are able to appropriately set a region for providing information about a moving body to a user, and appropriately provide information to a user who enters or exits from the set region.

In a first example aspect of the present disclosure, an information provision device includes:

a moving body position acquisition unit configured to acquire positional information about a moving body being movable;

a region setting unit configured to set one or more regions for providing information about the moving body to a user terminal, based on a position of the moving body;

a terminal position acquisition unit configured to acquire positional information about a user terminal being movable; and an information provision control unit configured to control whether to provide information about the moving body being associated with the region to the user terminal, based on a positional relationship between the acquired positional information about the user terminal and the set region.

In a second example aspect of the present disclosure, an information provision system includes:

a moving body position acquisition unit configured to acquire positional information about a moving body being movable;

a region setting unit configured to set one or more regions for providing information about the moving body to a user terminal, based on a position of the moving body;

a terminal position acquisition unit configured to acquire positional information about a user terminal being movable; and an information provision control unit configured to control whether to provide information about the moving body being associated with the region to the user terminal, based on a positional relationship between the acquired positional information about the user terminal and the set region.

In a third example aspect of the present disclosure, an information provision method includes:

acquiring positional information about a moving body being movable;

setting one or more regions for providing information about the moving body to a user terminal, based on a position of the moving body;

acquiring positional information about a user terminal being movable; and controlling whether to provide information about the moving body being associated with the region to the user terminal, based on a positional relationship between the acquired positional information about the user terminal and the set region.

In a fourth example aspect of the present disclosure, a program causes a computer to execute:

acquiring positional information about a moving body being movable;

setting one or more regions for providing information about the moving body to a user terminal, based on a position of the moving body;

acquiring positional information about a user terminal being movable; and controlling whether to provide information about the moving body being associated with the region to the user terminal, based on a positional relationship between the acquired positional information about the user terminal and the set region.

BRIEF DESCRIPTION OF DRAWINGS

The above and other aspects, features and advantages of the present disclosure will become more apparent from the following description of certain embodiments when taken in conjunction with the accompanying drawings, in which:

FIG. 8 is a table illustrating geofence definition information about the moving body;

FIG. 9 is a table illustrating speed-specific content definition information about the moving body;

FIG. 10 is a table illustrating relative angle-specific content definition information between the moving body and a user;

FIG. 31 is a table illustrating an adjustment value for each time period;

FIG. 34 is a diagram illustrating an example of changing a classification of a content being associated with the same geofence;

FIG. 36 is a diagram illustrating an example of changing a classification of a content being associated with the same geofence;

EXAMPLE EMBODIMENT

First Example Embodiment

Example embodiments of the present disclosure will be described below with reference to the drawings.

Figure 1:
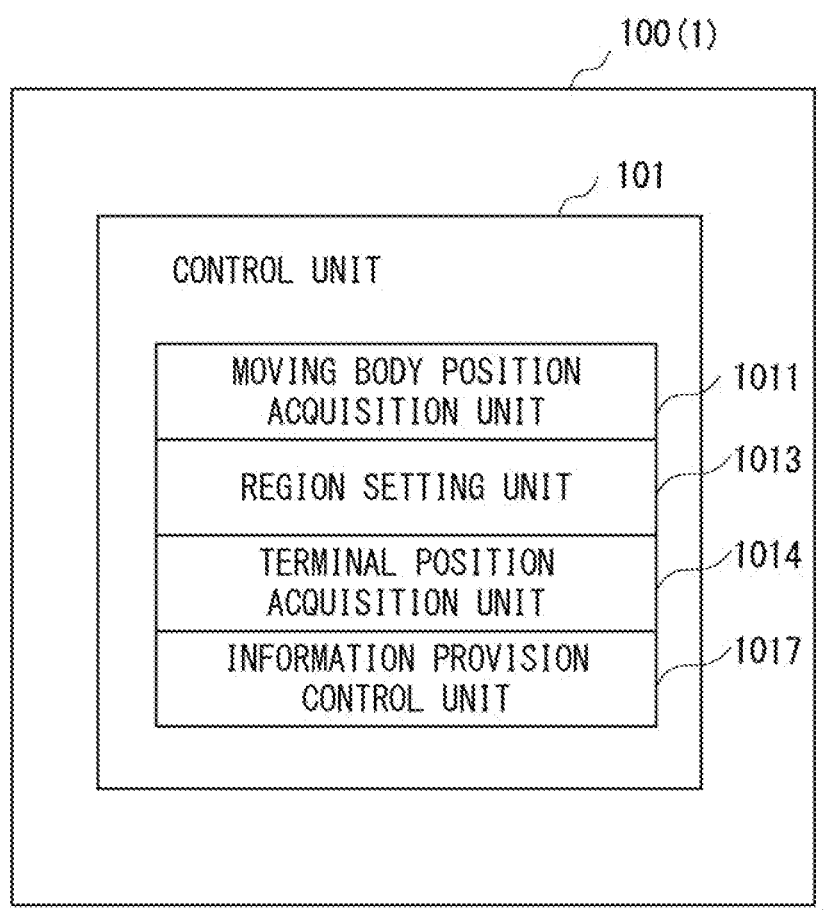
FIG. 1 is a diagram illustrating a configuration example of an information provision device according to a first example embodiment.

With reference to FIG. 1, an information provision device according to the present example embodiment will be described.

An information provision device 100 according to the present example embodiment can be used for distributing information about a moving body that is movable to one or more user terminals. Further, the information provision device 100 can be used for dynamically setting a region (for example a geofence) associated with a moving body in order to provide information about the moving body. The information provision device 100 may be achieved by a computer including a processor such as a central processing unit (CPU), a memory, an interface circuit, and the like. The information provision device 100 may include a control unit 101, a storage unit, and the like.

The control unit 101 includes a moving body position acquisition unit 1011, a region setting unit 1013, a terminal position acquisition unit 1014, and an information provision control unit 1017.

The moving body position acquisition unit 1011 acquires positional information about a moving body that is movable. The moving body position acquisition unit 1011 can acquire a position of the moving body over time, and calculate a movement path in a predetermined period. For example, the moving body is provided with a global positioning system (GPS) receiver, and the moving body position acquisition unit 1011 can acquire positional information about the moving body from the GPS receiver via a wired or wireless network. The moving body herein may include various moving bodies that may perform a sound notification, such as a door-to-door sales automobile such as a kitchen car, a penguin line, a mascot character visit, and a festival car, and the like, which are not limited thereto. The moving body may intend to provide information (for example, an advertisement, publicity, an announcement, and the like) about the moving body to a user terminal.

The region setting unit 1013 sets one or more regions for providing information about the moving body to a user terminal, based on a position of the moving body. In the present specification, the region may be referred to as a geofence, a zone, and the like. The region includes various parameters such as a distance from the moving body, and a size, a width, and a shape of the region, and the information may be stored inside the information provision device or an external storage unit.

The terminal position acquisition unit 1014 acquires positional information about a user terminal that is movable. The user terminal may be, for example, various terminals such as a smartphone, a wearable device, and a smartwatch. For example, the user terminal is provided with the GPS receiver, and the terminal position acquisition unit 1014 can acquire positional information about the user terminal from the GPS receiver via a wired or wireless network. The terminal position acquisition unit 1014 can acquire a position of the user terminal over time, and calculate a movement path in a predetermined period.

The information provision control unit 1017 controls whether to provide information about the moving body being associated with the region to the user terminal, based on a positional relationship between the acquired positional information about the user terminal and the set region. When the information provision control unit 1017 determines that a user enters the set region from the acquired positional information about the user terminal, the information provision control unit 1017 can provide the information about the moving body to the user terminal. Alternatively, when the information provision control unit 1017 determines that a user exits from the set region from the acquired positional information about the user terminal, the information provision control unit 1017 can provide the information about the moving body to the user terminal. The information about the moving body may include advertisement, publicity, or announcement information about the moving body, which are not limited thereto. The information about the moving body being associated with the region may be stored inside the information provision device or the external storage unit.

According to the present example embodiment, a region for appropriately providing content information to a user can be set for a moving body that is movable, and information about the moving body can be appropriately provided to the user.

Note that, as a modification example of the first example embodiment, at least a part of a component of the information provision device described above can be implemented by another information provision device and achieved in cooperation. An information provision system 1 according to the modification example includes: a moving body position acquisition unit 1011 that acquires positional information about a moving body that is movable; a region setting unit 1013 that sets one or more regions for providing information about the moving body to a user terminal, based on a position of the moving body; a terminal position acquisition unit 1014 that acquires positional information about a user terminal; and an information provision control unit 1017 that controls whether to provide information about the moving body being associated with the region to the user terminal, based on a positional relationship between the acquired positional information about the user terminal and the set region.

The present disclosure may adopt an aspect as an information provision method. The information provision method includes: acquiring positional information about a moving body that is movable; setting one or more regions for providing information about the moving body to a user terminal, based on a position of the moving body; acquiring positional information about a user terminal that is movable; and controlling whether to provide information about the moving body being associated with the region to the user terminal, based on a positional relationship between the acquired positional information about the user terminal and the set region. A program is a program causing a computer to execute such an information provision method.

Second Example Embodiment

Figure 2:
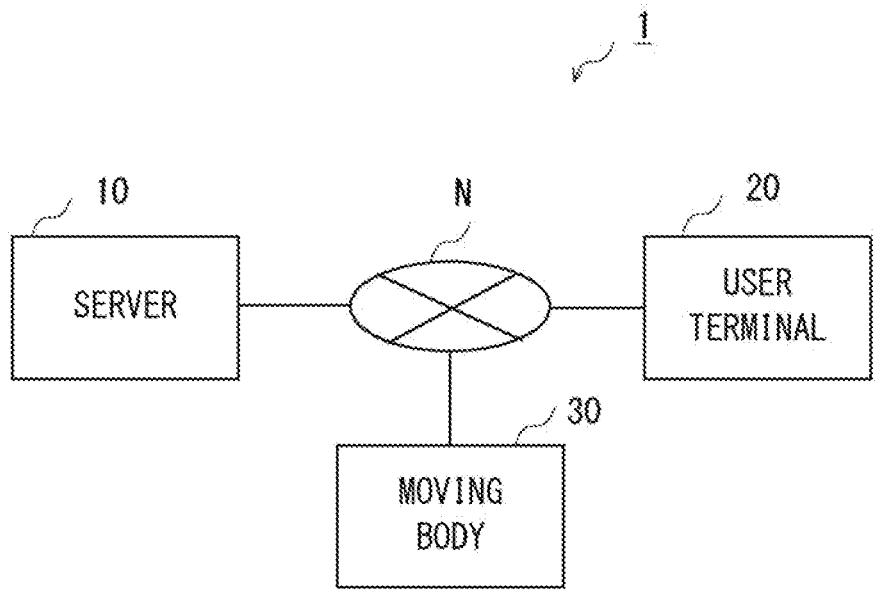
FIG. 2 is a diagram illustrating a configuration example of an information provision system according to a second example embodiment.

FIG. 2 is a diagram illustrating a configuration example of an information provision system.

An information provision system 1 is a system for providing various information contents of a shop, a moving body including a sales automobile, or the like to a user terminal possessed by a user by using a geofence. The information provision system 1 includes a server 10, (may also be referred to as an information provision device), and a user terminal 20 and a moving body 30 that are connected to the server 10 via a wired or wireless network N. The network N may include a local area network (LAN) and a wide area network (WAN), for example, the Internet and a moving body communication network. The server 10 is one example of the information provision device according to the first example embodiment.

The server 10 provides, to a user who enters a geofence, information (for example, a coupon, an event, and the like) about a moving body (for example, a door-to-door sales automobile, and the like) that is movable, or a specific target object, a specific facility, a specific shop, and the like that are not movable on a map, or a guide service (may also be referred to as a content service) that fuses "video AR" and "acoustic AR", for example. The moving body, the target object, or the like is associated with a preset geofence. The geofence is an area surrounded by a virtual fence (boundary line) provided on a map. In the present specification, the geofence may be simply referred to as a region or a zone.

The user terminal 20 may be a user terminal possessed by a user, for example, various terminals such as a smartphone, a wearable device, and a smartwatch. The user terminal 20 is provided with the global positioning system (GPS) receiver, and can transmit positional information about the user terminal (i.e., positional information about a moving user) to the server 10. The user terminal 20 may include a computer including a memory, a processor, and the like.

The moving body 30 may intend to provide various contents to a plurality of user terminals. Examples of the moving body 30 include various moving bodies that may perform a sound notification, such as a door-to-door sales automobile such as a kitchen car, a penguin line, a mascot character visit, and a festival car, and the like, which are not limited thereto. The moving body 30 includes the GPS receiver, and can transmit positional information about the moving body to the server 10. The moving body 30 may include a computer including a memory, a processor, and the like.

Figure 3:
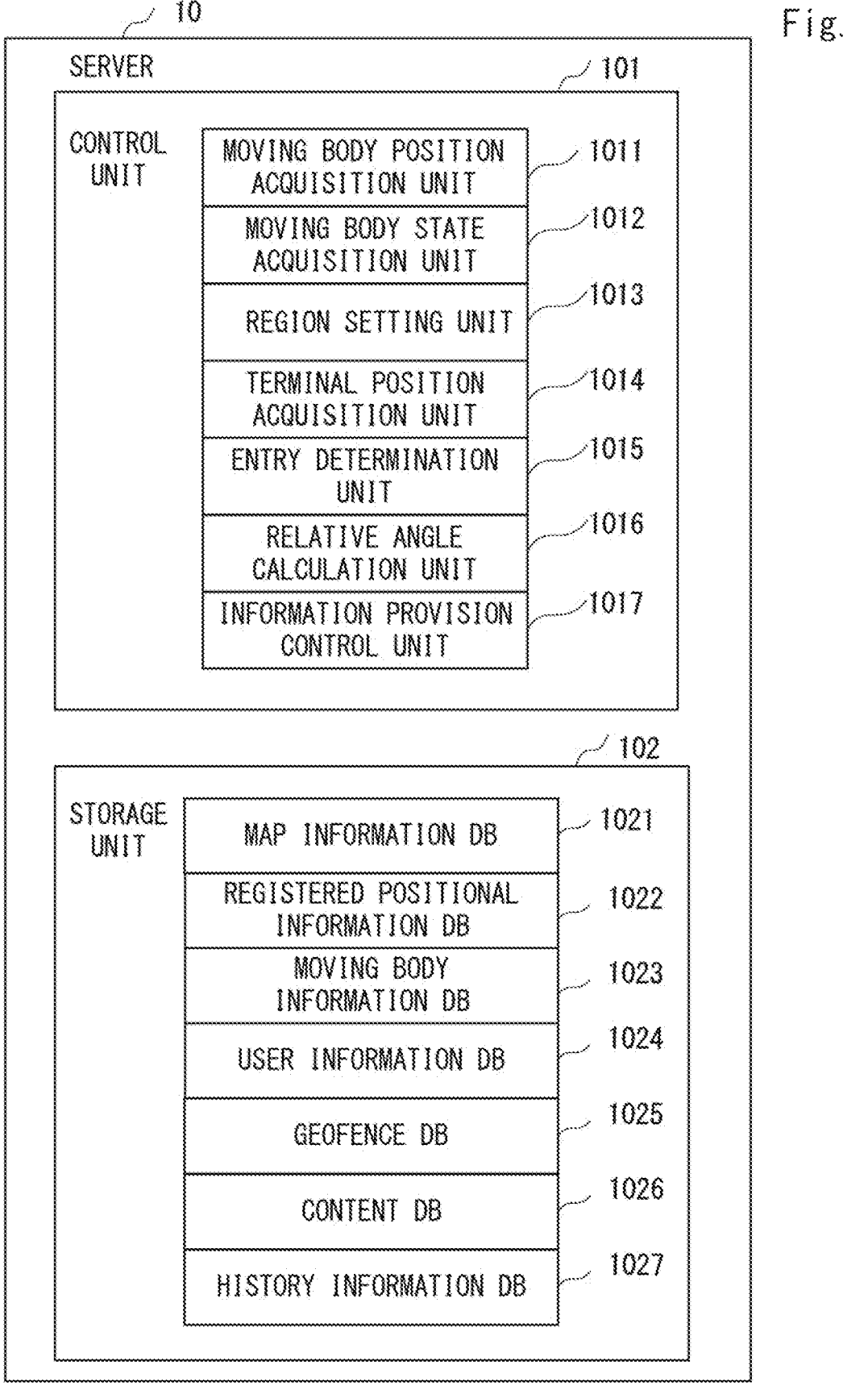
FIG. 3 is a diagram illustrating a configuration example of a server according to the second example embodiment.

FIG. 3 is a diagram illustrating a configuration example of the server.

The server 10 is a computer including a control unit 101 and a storage unit 102. The control unit 101 includes a processor such as a central processing unit (CPU). The control unit 101 includes a moving body position acquisition unit 1011, a moving body state acquisition unit 1012, a region setting unit 1013, a terminal position acquisition unit 1014, an entry determination unit 1015, a relative angle calculation unit 1016, and an information provision control unit 1017. The storage unit 102 includes a map information database 1021, a registered positional information database 1022, a moving body information database 1023, a user information database 1024, a geofence database 1025, a content database 1026, and a history information database 1027.

The moving body position acquisition unit 1011 acquires positional information about a moving body that is movable. The moving body position acquisition unit 1011 can acquire positional information about the moving body in a predetermined cycle, based on a reception signal being transmitted from the GPS receiver attached to the moving body.

The moving body state acquisition unit 1012 acquires a state of the moving body including a movement direction, a movement speed, and the like of the moving body. The moving body state acquisition unit 1012 can acquire a state of the moving body including a movement direction and a movement speed of the moving body from an azimuth sensor, a speed sensor, and the like attached to the moving body. The moving body state acquisition unit 1012 can also acquire a state indicating whether the moving body is traveling or stopping in a predetermined cycle.

The region setting unit 1013 sets one or more regions (for example, geofences or zones) for providing the information about the moving body to a user terminal, based on a position of the moving body being acquired by the moving body position acquisition unit 1011. In some example embodiments, the region setting unit 1013 can set various regions associated with map information according to a current position, a movement direction, and a movement speed of the moving body. In the present example embodiment, the region setting unit 1013 dynamically sets one or more regions (for example, geofences or zones) according to a position of the moving body. Details of a method for setting a region will be described below.

The terminal position acquisition unit 1014 acquires positional information about a user terminal possessed by each of many users. The terminal position acquisition unit 1014 can acquire positional information about the user terminal, based on a signal from the GPS receiver built in the user terminal.

The entry determination unit 1015 determines whether a user enters a set geofence. Details of an entry determination will be described below.

The relative angle calculation unit 1016 calculates a relative angle between the user (i.e., the user terminal) and the moving body. For example, the relative angle calculation unit 1016 calculates a relative angle between the user when entering a region (for example, a geofence) and the moving body. Details of a relative angle calculation method will be described below.

The information provision control unit 1017 provides information about the moving body being associated with the region to the user terminal, based on a positional relationship between the acquired positional information about the user terminal and the set region. For example, when a position of the user terminal moves from the outside of the set region to the inside of the region, the information provision control unit 1017 can provide information (for example, a sound content, and the like) about the moving body being associated with the region to the user terminal. Further, when a position of the user terminal moves from the inside of the set region to the outside of the region, the information provision control unit 1017 can provide information about the moving body being associated with the region to the user terminal. The information provision control unit 1017 can provide a different content (for example, a content having a different content or reproduction time) according to a movement speed of the moving body. Further, the information provision control unit 1017 can provide a different content (for example, a video content having a different point of view, angle of view, sound source position, or the like) according to a relative angle threshold value between a user and the moving body. When the information provision control unit 1017 provides a sound content, the information provision system may also be referred to as a sound notification system.

Next, details of the storage unit 102 will be described.

The map information database 1021 can include information such as a road network including a roadway, a sidewalk, and the like, a fork including an intersection point, a T-junction, and the like, a signal, a traffic sign, various buildings, and a facility. The map information database 1021 can separate and store a road on which the moving body 30 can move and a region in which the moving body 30 cannot move.

The registered positional information database 1022 stores information about a registered target object such as a shop, a building, an art museum, a movie theater, a historical site, and a tourist site, for example. Further, the registered positional information database 1022 can store positional information about various objects such as a sign, a signboard, a mannequin, a mascot doll, an animal, and a firework. By registering such information in the information provision system 1 in advance by a person involved in a facility, such information can be provided to the user terminal 20 of a user who enters a geofence associated with the facility. Content data that fuse information related to registered positional information, video AR, and acoustic AR may be provided.

The moving body information database 1023 stores information about various moving bodies such as a moving body that may perform a sound notification, such as a door-to-door sales automobile such as a kitchen car, a penguin line, a mascot character visit, and a festival car. The moving body information database 1023 can also store a moving body ID and information (for example, a car type and a purpose) about the moving body. The moving body information database 1023 can also store current or past positional information about the moving body.

The user information database 1024 can include information (user identification information) about a user, such as a user ID, a password, a terminal ID, age, gender, a hobby, and a preference, for a user who desires to receive content information via the user terminal 20. Further, the user information database 1024 can include information about a target object such as various objects, such as a shop, a building, an art museum, a movie theater, a historical site, a tourist site, a sign, a signboard, a mannequin, a mascot doll, an animal, and a firework that a user desires information distribution, or information about the moving body. The user ID is an identifier that uniquely identifies a user. The terminal ID is an identifier that uniquely identifies a user terminal.

The geofence database 1025 can include, in association with the registered positional information described above, a geofence ID, a latitude, a longitude, a range, a size, an entry angle threshold value, and an exit angle threshold value of a set geofence. The geofence ID is an identifier that uniquely identifies a geofence. The entry angle threshold value and the exit angle threshold value are freely set by a content provider. The entry angle threshold value and the exit angle threshold value each have an upper limit threshold value and a lower limit threshold value. When the entry angle threshold value and the exit angle threshold value are compared with an actual entry angle and an actual exit angle of a user, and the entry angle and the exit angle of the user fall within a threshold value, i.e., fall within the upper limit threshold value and the lower limit threshold value, a content is provided to the user. When the entry angle and the exit angle of the user fall outside a threshold value, i.e., fall outside the upper limit threshold value and the lower limit threshold value, a content is not provided to the user.

Further, the geofence database 1025 can include, in association with the moving body information described above, a geofence ID, a latitude, a longitude, a range, a size, an entry angle threshold value, and an exit angle threshold value of a set geofence. The geofence database 1025 can store a table illustrating geofence definition information (for example, an arrangement, a size, a number, and a distance from the moving body) about the moving body (for example, being associated with a moving body speed threshold value).

The content database 1026 can include various content information being associated with a moving body ID, a geofence ID, and a user ID. The content information may be a content having a predetermined reproduction time and including acoustic AR, or may be content data that fuse video AR and acoustic AR and having a predetermined reproduction time. A length, i.e., a predetermined reproduction time of such a content can be freely set in consideration of a walking speed of a user, a distance between a geofence and a shop, and the like. The content database 1026 also stores a table illustrating speed-specific content definition information about the moving body and relative angle-specific content definition information between the moving body and a user.

Furthermore, the history information database 1027 can store history information about a user terminal ID, a moving body ID, a geofence ID, and provision of a content. Further, the history information database 1027 can further store a provision time of content information. The history information database 1027 is also referred to as a history information storage unit.

Note that, in the example described above, the storage unit 102 is provided inside the server 10, but the storage unit 102 may be located outside the server 10. In that case, as long as the storage unit 102 is located in the information provision system, the present disclosure can also be achieved by a server connected to a storage unit provided outside the server 10 via a network.

The user terminal 20 is, for example, a computer that may be carried by a user who walks in a town, and may be, for example, a portable terminal such as a smartphone, a wearable device, a smartphone watch, and a hearable device.

Figure 4:
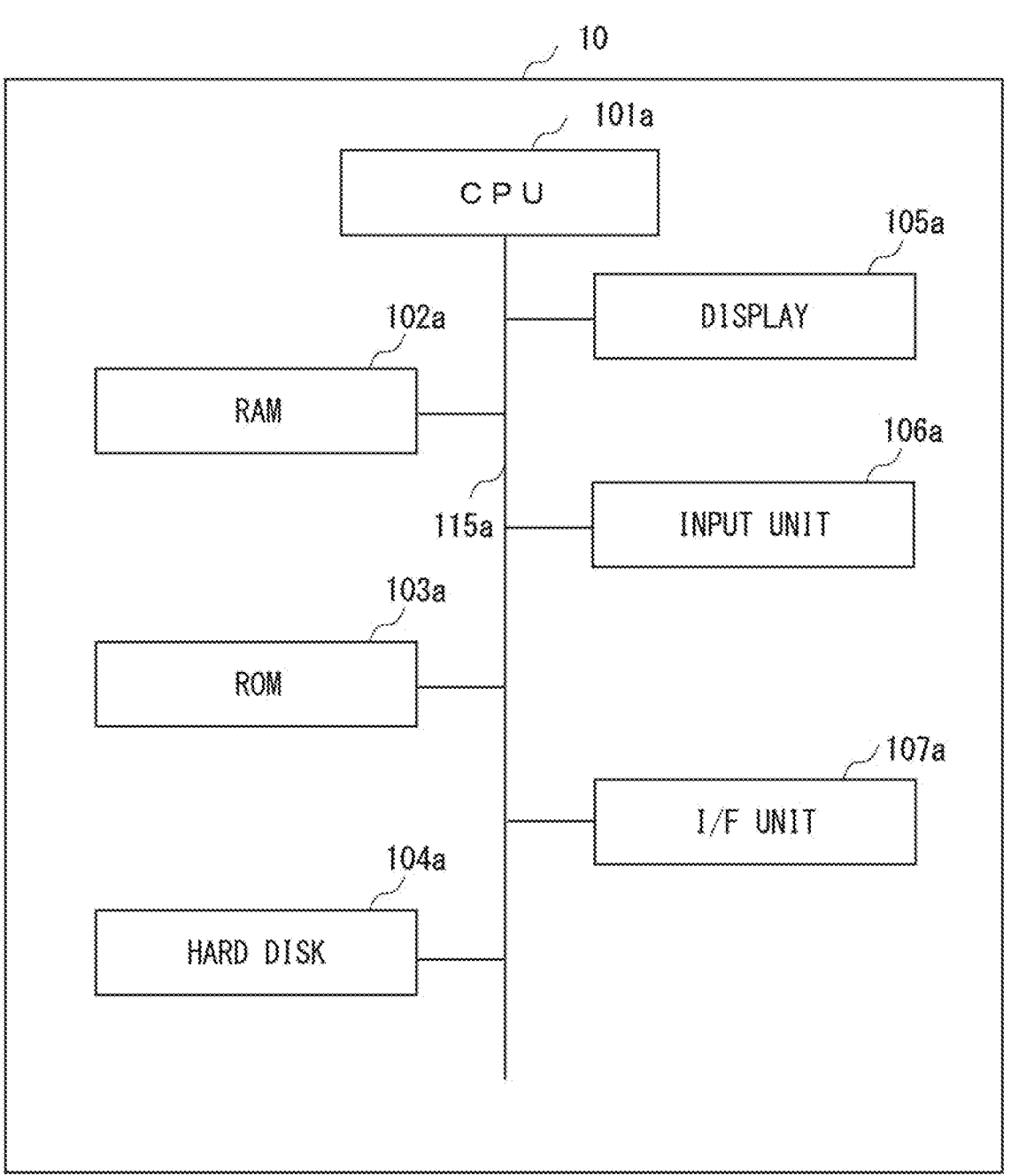
FIG. 4 is a diagram illustrating a hardware configuration example of the server according to the second example embodiment.

FIG. 4 is a block diagram illustrating a hardware configuration example of the server 10 according to the present example embodiment. As illustrated in FIG. 4, the server 10 is a computer (information processing device) including a CPU 101a, a RAM 102a, a ROM 103a, and the like. The CPU 101a performs an arithmetic operation and control according to software stored in the RAM 102a, the ROM 103a, or a hard disk 104a (the CPU is simply referred to as a processor). The RAM 102a is used as a temporary storage area when the CPU 101a performs various types of processing. The hard disk 104a stores an operating system (OS), a registration program, and the like. A display 105a is formed of a liquid crystal display and a graphic controller, and an object such as an image and an icon, a GUI, and the like are displayed on the display 105a. An input unit 106a is a device that provides various instructions from a user to the server 10, and is formed of a button, a keyboard, a screen keyboard, a mouse, and the like, for example. An interface (I/F) unit 107a can control wireless LAN communication and wired LAN communication associated with a standard such as IEEE 802.11a, and communicates with an external apparatus via the same communication network and the Internet, based on a protocol such as TCP/IP. A system bus 115a controls exchange of data between the CPU 101a, the RAM 102a, and the ROM 103a, and the hard disk 104a and the like.

Figure 5:
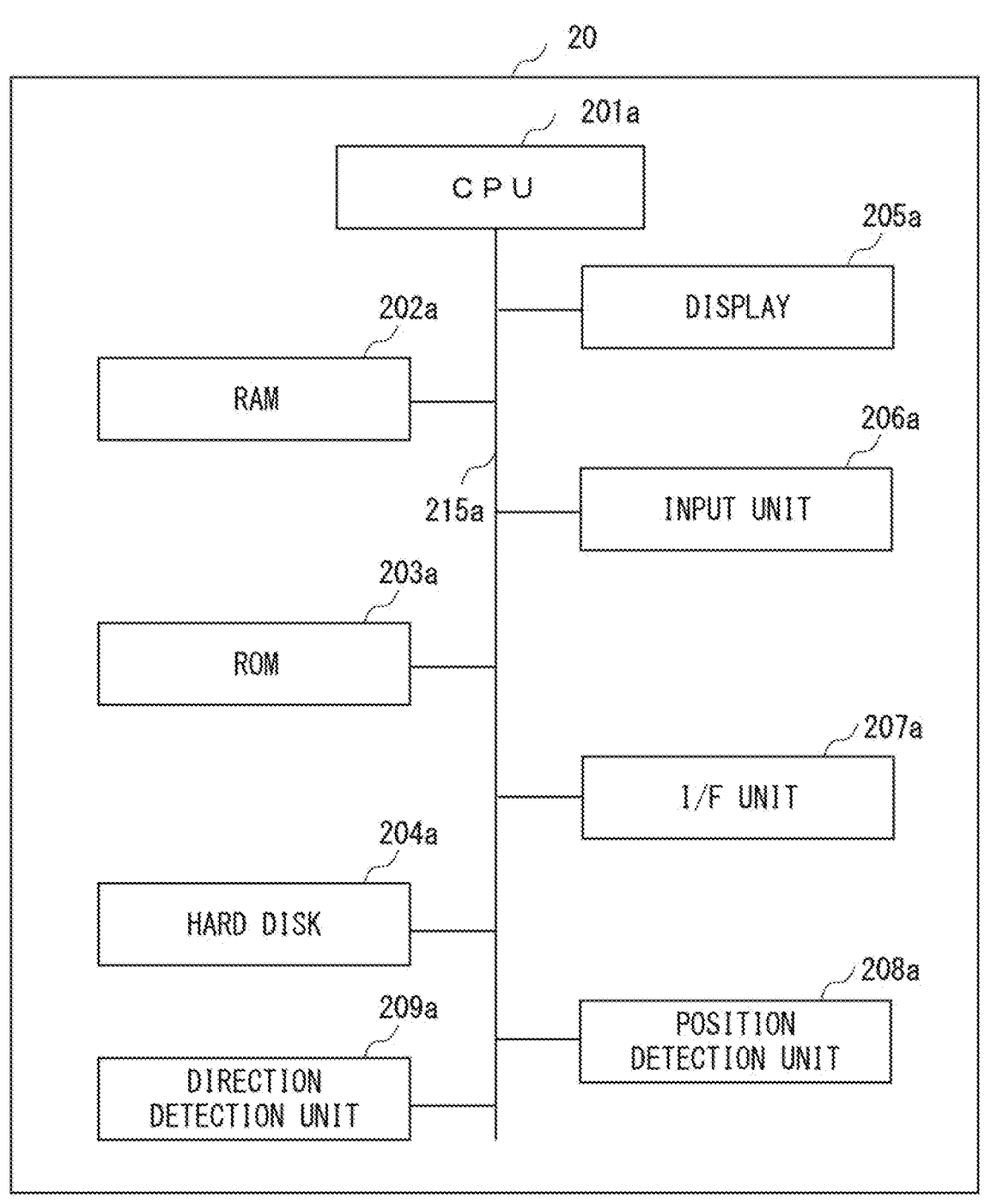
FIG. 5 is a diagram illustrating a hardware configuration example of a user terminal according to the second example embodiment.

FIG. 5 is a block diagram illustrating a hardware configuration example of the user terminal 20 according to the present example embodiment. As illustrated in FIG. 5, the user terminal 20 is a computer (information processing device) including a CPU 201a, a RAM 202a, a ROM 203a, and the like. The CPU 201a performs an arithmetic operation and control according to software stored in the RAM 202a, the ROM 203a, or a hard disk 204a (the CPU is simply referred to as a processor). The RAM 202a is used as a temporary storage area when the CPU 201a performs various types of processing. The hard disk 204a stores an operating system (OS), a registration program, and the like. A display 205a is formed of a liquid crystal display and a graphic controller, and an object such as an image and an icon, a GUI, and the like are displayed on the display 205a. An input unit 206a is a device that provides various instructions from a user to the user terminal 20, and is formed of a button, a keyboard, a screen keyboard, a mouse, and the like, for example. An interface (I/F) unit 207a can control wireless LAN communication and wired LAN communication associated with a standard such as IEEE 802.11a, and communicates with an external apparatus via the same communication network and the Internet, based on a protocol such as TCP/IP. A position detection unit 208a includes a global positioning system (GPS) receiver, and can detect a current place and a current time of a user terminal on the earth by receiving a radio wave being transmitted from an artificial satellite. A direction detection unit 209a includes a nine-axis sensor including a three-axis acceleration sensor, a three-axis gyro sensor, a three-axis compass sensor, and the like for acquiring a direction of a user terminal. A system bus 215a controls exchange of data between the CPU 201a, the RAM 202a, and the ROM 203a, and the hard disk 204a and the like.

Note that, in the hardware configuration example of the user terminal 20 described above, the display 205a for displaying a video such as video AR and image data is provided, but the display 205a may not be provided in a case of a sound service that provides sound data such as acoustic AR. Further, in order to receive and listen to a sound service, earphones, headphones, a headset, a hearable device, and the like connected to the interface (I/F) unit 207a of the user terminal in a wired or wireless manner may be used.

Figure 6:
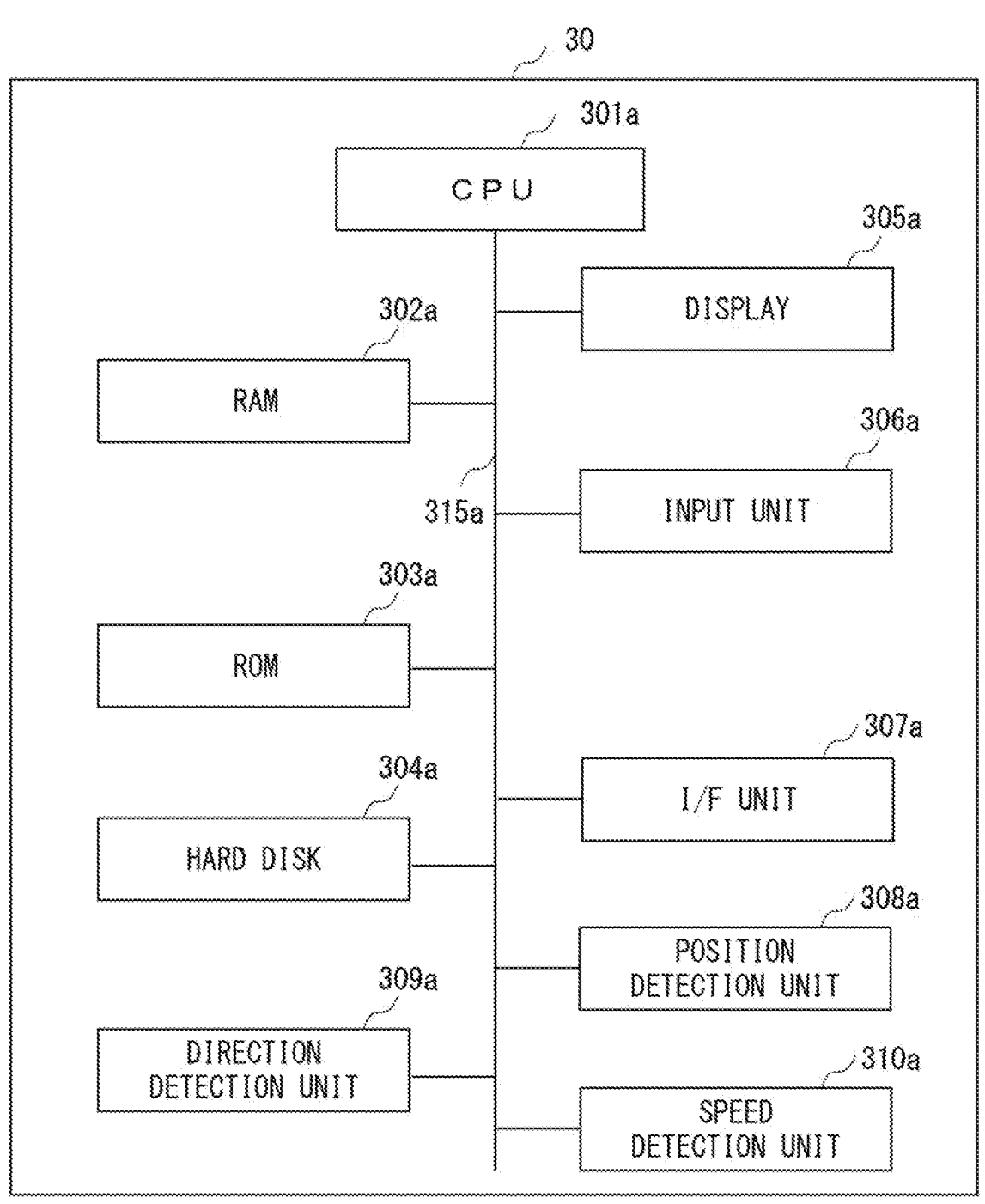
FIG. 6 is a diagram illustrating a hardware configuration example of a control unit of a moving body according to the second example embodiment.

FIG. 6 is a block diagram illustrating a hardware configuration example of a control unit mounted on the moving body 30 according to the present example embodiment. As illustrated in FIG. 6, the control unit of the moving body 30 is a computer (information processing device) including a CPU 301a, a RAM 302a, a ROM 303a, and the like. The CPU 301a performs an arithmetic operation and control according to software stored in the RAM 302a, the ROM 303a, or a hard disk 304a (the CPU is simply referred to as a processor). The RAM 302a is used as a temporary storage area when the CPU 301a performs various types of processing. The hard disk 304a stores an operating system (OS), a registration program, and the like. A display 305a is formed of a liquid crystal display and a graphic controller, and an object such as an image and an icon, a GUI, and the like are displayed on the display 305a. An input unit 306a is a device that provides various instructions from a user to the moving body 30, and is formed of a button, a keyboard, a screen keyboard, a mouse, and the like, for example. An interface (I/F) unit 307*a* can control wireless LAN communication and wired LAN communication associated with a standard such as IEEE 802.11a, and communicates with an external apparatus via the same communication network and the Internet, based on a protocol such as TCP/IP. A position detection unit 308*a* includes a global positioning system (GPS) receiver, and can detect a current place and a current time of a user terminal on the earth by receiving a radio wave being transmitted from an artificial satellite. A direction detection unit 309*a* includes a nine-axis sensor including a three-axis acceleration sensor, a three-axis gyro sensor, a three-axis compass sensor, and the like for acquiring a direction of a user terminal. A system bus 315*a* controls exchange of data between the CPU 301*a*, the RAM 302*a*, and the ROM 303*a*, and the hard disk 304*a* and the like. A speed detection unit 310*a* includes a vehicle speed detection sensor or another suitable speed sensor.

Figure 7:
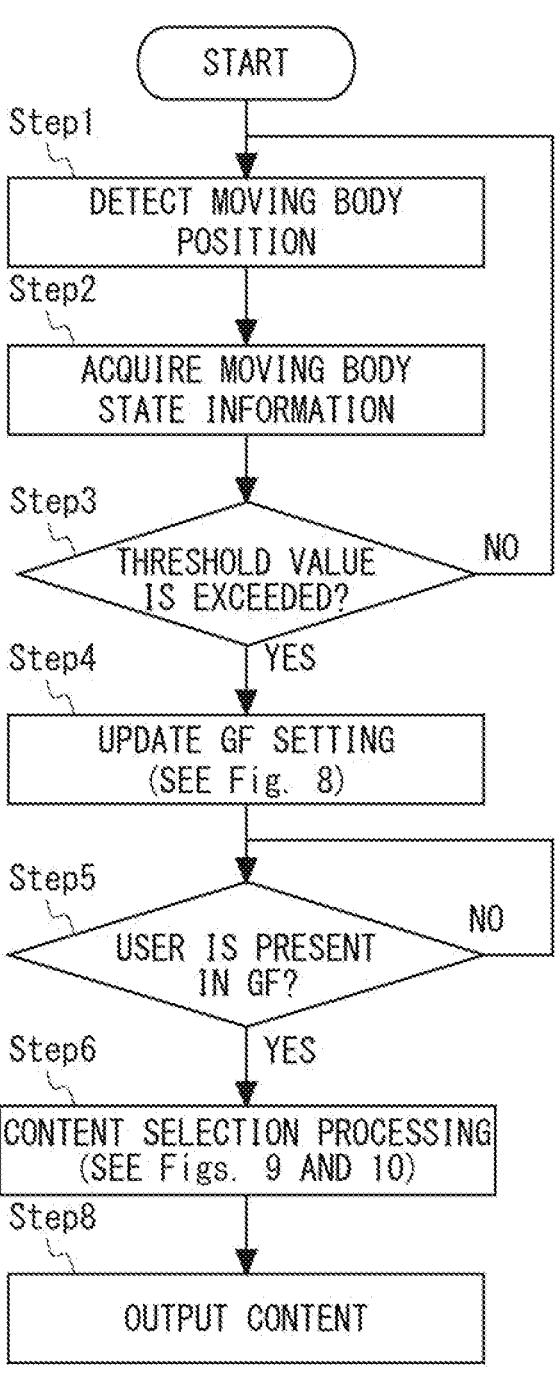
FIG. 7 is a flowchart illustrating geofence setting and a content provision method of the moving body according to the second example embodiment.

Next, details of a method for setting a geofence of a moving body will be described. The geofence may be abbreviated as a GF in FIG. 7 and the like.

A kitchen car will be described as one example of a moving body. The kitchen car travels to a food and drink service provision place (destination), arrives the provision place, then stops, and starts provision of a food and drink service. Such a situation will be described by using FIGS. 7 and 8.

The kitchen car as an example herein is assumed to both move and stop (for example, during service provision), and is assumed to provide a guide sound content to a user (for example, a customer) in both the cases. Further, provision and notification of a guide sound content are assumed to continue both in a traveling state and a state where the food and drink service starts after a stop. Thus, examples of another moving body include a penguin line, a mascot character visit, a parade, and a festival car, which are not limited thereto. The present example embodiment can also be applied to another moving body that may perform provision of a sound content.

First, in a traveling state of the kitchen car, in the information provision system 1, the moving body position acquisition unit 1011 of the server 10 regularly acquires positional information about the kitchen car by a GPS and the like mounted on the kitchen car (Step 1). The moving body state acquisition unit 1012 regularly acquires state information such as a movement speed and a movement direction by various sensors, an acceleration sensor, and the like mounted on the kitchen car (Step 2). For the state information, a movement speed and a movement direction may be calculated based on a plurality of pieces of positional information, or, when an acceleration sensor and the like are mounted on the kitchen car, speed information and a movement direction may be acquired from the sensor.

Herein, in the information provision system 1, when the positional information and the state information (for example, a movement direction and a movement speed) being acquired from the kitchen car exceed a movement speed threshold value defined in the table in FIG. 8 (YES in Step 3), the region setting unit 1013 successively updates geofence setting information being set for the kitchen car with reference to the geofence definition information in FIG. 8 (Step 4). When the positional information and the state information (for example, a movement direction and a movement speed) being acquired from the kitchen car do not exceed the movement speed threshold value defined in the table in FIG. 8 (NO in Step 3), the positional information and the state information (for example, a movement direction and a movement speed) about the kitchen car continue to be acquired (Step 1, Step 2).

Figure 11:
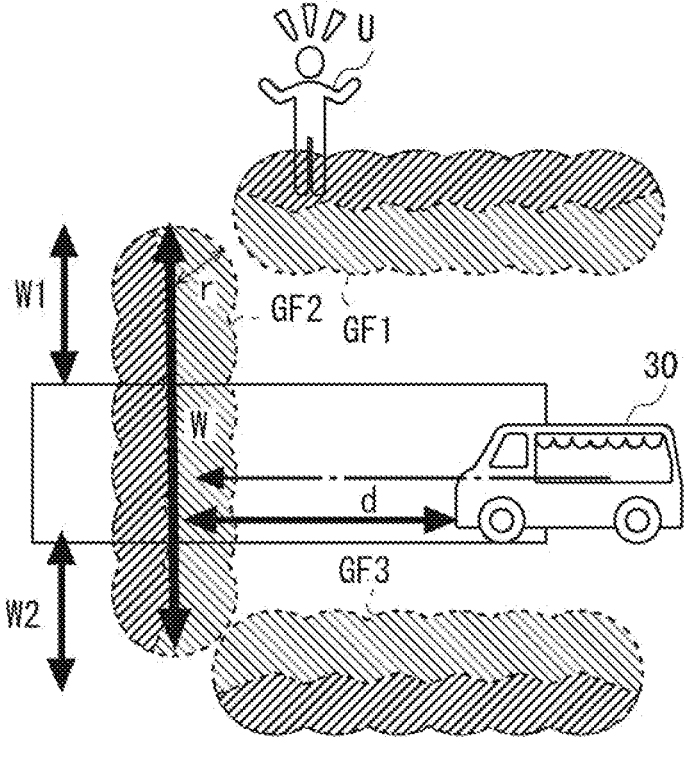
FIG. 11 is a diagram illustrating a setting example of a geofence according to a movement speed of the moving body.

Herein, the geofence setting information being set for the kitchen car will be described by using the table in FIG. 8. First, as an initial state, when the kitchen car starts to travel at a speed of less than 10 km per hour, the region setting unit 1013 disposes, according to the table in FIG. 8, three geofences GF1 to GF3 each at a distance of d2 on each of a front side and both lateral sides with respect to a movement direction of the kitchen car (see FIG. 11). Herein, the front geofence GF2 is installed at the distance d2 from a tip of the kitchen car, and the geofence setting position also changes as the kitchen car moves forward. As illustrated in FIG. 8, in the present example, the geofence on the front side has a long and narrow shape in which m circular shapes having a radius $r_2$ are disposed in an overlapping manner, for example. Similarly, the geofences on both the lateral sides of the kitchen car are also set in such a way as to move forward as the kitchen car moves forward. In the present example, the geofences on both the sides also have a long and narrow shape in which m circular shapes having a radius $r_2$ are disposed in an overlapping manner, for example.

Figure 12:
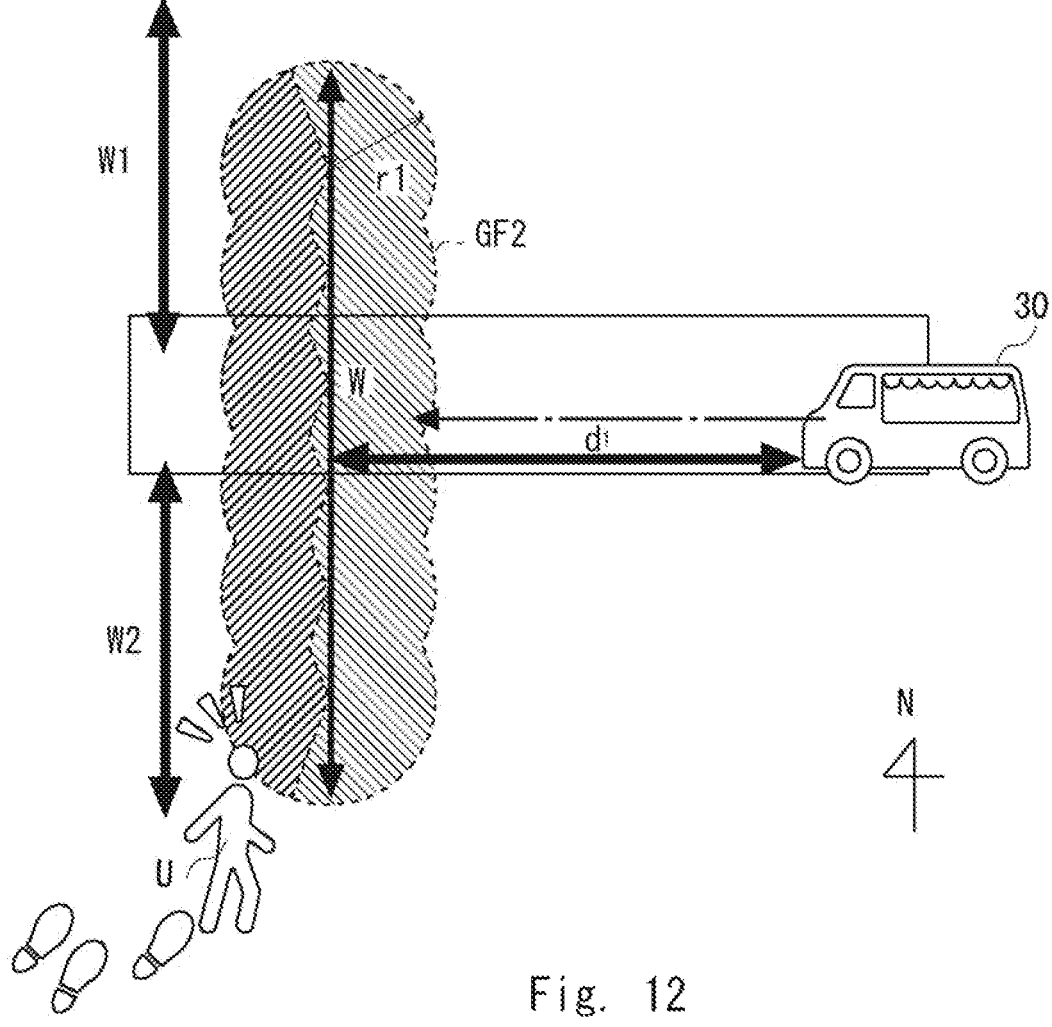
FIG. 12 is a diagram illustrating a setting example of the geofence according to a movement speed of the moving body.

On the other hand, when the kitchen car starts to travel at a speed of equal to or more than 10 km per hour, the region setting unit 1013 disposes, according to the table in FIG. 8, a geofence at a distance of d1 on the front side with respect to the movement direction of the kitchen car (see FIG. 12). As illustrated in FIG. 8, in the present example, the geofence on the front side has a long and narrow shape in which m circular shapes having a radius $r_1$ are disposed in an overlapping manner, for example.

Further, when the kitchen car stops (i.e., at a speed of 0 km per hour), the region setting unit 1013 disposes, according to the table in FIG. 8, a circular geofence all around the kitchen car. As illustrated in FIG. 8, in the present example, the geofence has a circular shape having a radius $r^3$ (for example, number 1=0, GF distance $d_3$=0), for example.

The terminal position acquisition unit 1014 of the server 10 regularly acquires a position of a user terminal possessed by a user U. When a position of the user terminal of the user U who is walking enters the geofence (YES in Step 5), i.e., when the geofence is in a state of including a pedestrian position, the information provision control unit 1017 selects a sound content according to state information about the kitchen car at that time (Step 6). The selected content is output to the user terminal via a network (Step 8).

The information provision control unit 1017 may output an instruction for content reproduction. The information provision control unit 1017 can select an optimum content, based on the speed-specific content definition information in FIG. 9 or the relative angle-specific content definition information in FIG. 10, and can output the optimum content to the user terminal. As illustrated in FIG. 9, the information provision control unit 1017 can provide a different content depending on whether a movement speed of the kitchen car exceeds a threshold value (for example, a speed of 10 km per hour). Further, the information provision control unit 1017 can provide a different content depending on whether the kitchen car is stopping (i.e., a speed of 0 km per hour) or traveling. Further, in the other example embodiment, as illustrated in FIG. 10, a relative angle between the user and the moving body may be calculated, and the information provision control unit 1017 may output a different content according to the calculated relative angle. The different content may be, for example, a sound content subjected to sound localization according to a relative angle. Details of the content will be described below.

By adopting such a configuration, a geofence setting position is dynamically adjusted based on positional information and state information about the kitchen car. Thus, regardless of whether a user is in a walking state or a stopping state, the user can listen to a sound content at an optimum timing according to a movement situation of the kitchen car being a moving body. Even when a moving body having a geofence being set passes by a stopping user, the user can acquire information about the moving body via a user terminal.

Figure 13:
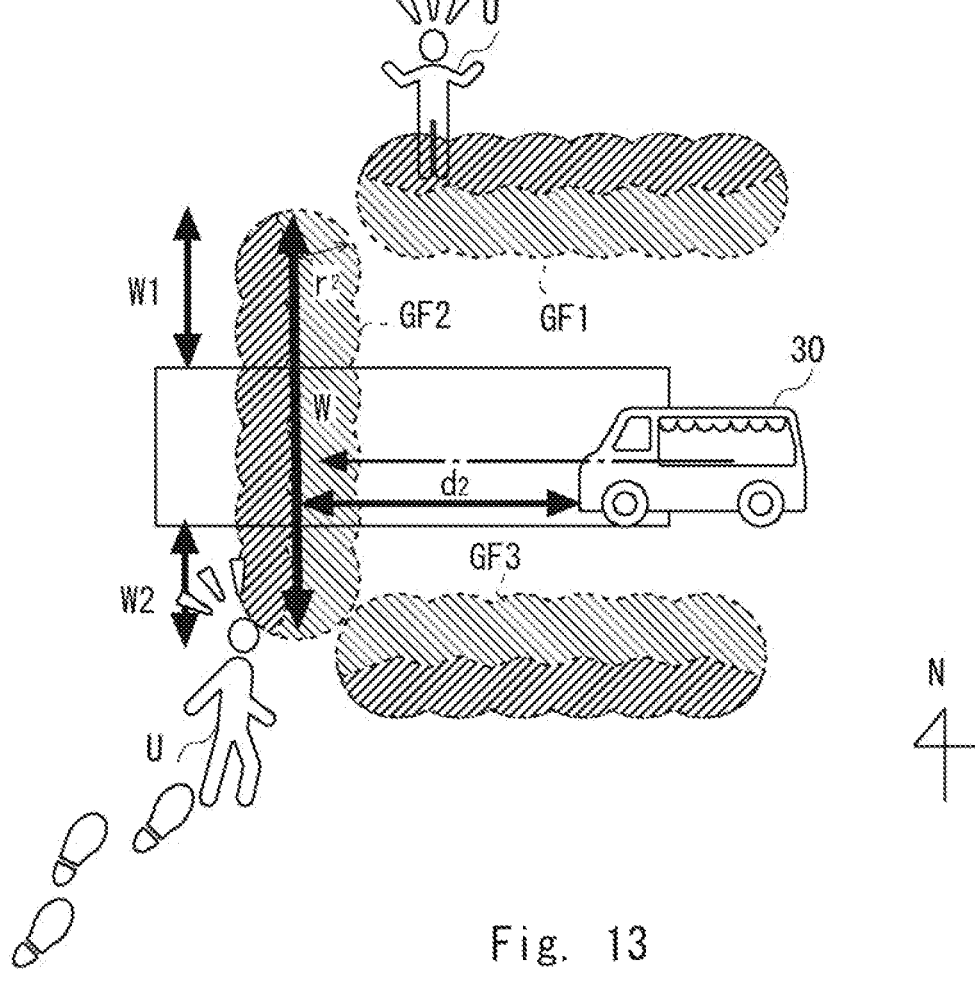
FIG. 13 is a diagram illustrating a setting example of the geofence according to a movement speed of the moving body.

With reference to FIGS. 8, 12, and 13, a setting example of a geofence according to a movement speed of a moving body will be described.

As illustrated in FIGS. 8 and 12, when the moving body 30 approaches the vicinity of a destination and reduces a speed but still travels at a relatively fast speed, the geofence GF2 is set in response to equal to or more than a movement speed threshold value (for example, a speed of equal to or more than 10 km per hour) of the moving body. In other words, as illustrated in FIG. 8, in response to equal to or more than the movement speed threshold value (for example, a speed of equal to or more than 10 km per hour) of the moving body, a geofence (for example, a geofence formed of n circles having a radius r') having a predetermined shape is disposed at a distance $d_1$ from the moving body in a predetermined geofence arrangement (for example, a front side). In the present example, as illustrated in FIG. 12, the geofence GF2 has a long and narrow shape, and is disposed in such a way as to protrude from an end of a road on which the moving body travels.

On the other hand, as illustrated in FIGS. 8 and 13, when the moving body 30 approaches the vicinity of a destination, reduces a speed, and slowly travels, the geofence GF2 is set in response to less than the movement speed threshold value (for example, a speed of less than 10 km per hour) of the moving body. In other words, as illustrated in FIG. 13, a geofence (for example, a geofence formed of m circles having a radius $r^2$) having a predetermined shape is disposed at a distance $d_2$ from the moving body in a predetermined geofence arrangement (for example, a front side and both lateral sides). In the present example, the geofences GF1, GF2, and GF3 each have a long and narrow shape, and are each disposed in such a way as to surround the front side and both the lateral sides of the moving body 30. In the present example, as illustrated in FIG. 13, the geofence GF2 has a long and narrow shape, and is disposed in such a way as to protrude from an end of a road on which the moving body travels.

In some example embodiments, a geofence is set in a position farther from a moving body as a movement speed of the moving body is faster. The reason is that the moving body is prevented from passing by a position of a user before the user finishes listening to a sound content after the user enters the geofence. In other words, when the user enters the geofence being set in association with the moving body and is listening to a sound content (for example, an announcement that a service is to be provided at a destination), the user can visually confirm that the moving body passes by before eyes of the user. Subsequently, for example, when the moving body provides the service at the destination, the user can move to the destination, visually confirm the moving body, and receive provision of the service.

In some example embodiments, a greater number of geofences is set as a movement speed of a moving body is slower. The reason is that, when the moving body is about to arrive a destination, attracting users to the destination is promoted by providing information about the moving body to many users by increasing the number of geofences.

When a moving body is, for example, a car, a movement speed of the car depends on a driver, and an adjustment to a length of a reproduction time by a sound notification system is complicated. Thus, when a content is associated with a moving body, and a content reproduction start timing is decided regardless of a movement speed of the moving body, a time from a content reproduction start time to arrival at a user position is shortened as the moving body moves at a higher speed, and thus there is a higher possibility that the moving body passes by before the moving body attracts attention of a user.

The adjustment method will be described. The system always measures a movement speed of a moving body, and detects at least a position and a movement speed of a target object.

Based on a detected result, preset geofence definition information is changed based on the movement speed of the moving body. For example, as illustrated in FIG. 12, at a point in time of a certain position (x, y) at which the moving body 30 moves in a western direction at a speed of 15 km per hour, it is assumed that a geofence is set in a position at a distance d1 ahead in a movement direction, and the position is defined as, for example, (x–d1, y). Herein, when a movement speed of the moving body is reduced as in FIG. 11, the geofence is located in a position of (x–d2, y) of d2 smaller than the d1 value. In this way, a sound acquisition timing of a user can be optimized according to the movement speed of the moving body. Further, an adjustment to a distance value is similarly performed when a speed is reduced and increased.

For example, in a case where the kitchen car moves at a speed of 30 km per hour when a user enters a geofence, a sound can be acquired in a position in which a position of the kitchen car is located at a distance of 30 m from the user. In contrast, in a case where the kitchen car moves at a speed of 10 km per hour when a user enters a geofence, the user can acquire a sound in a position at a distance of 10 m.

In this way, regardless of whether a movement speed of a moving body is slow or fast, a reproduction start timing can be adjusted in such a way as to set a position of the moving body at an optimum distance for a user who finishes listening at a point in time of a reproduction end of sound data. Note that the timing is described as a point in time of a reproduction start herein, but may be a point in time at which the system outputs a sound content or at which the system instructs a reproduction start permission for a sound reproduction device.

A user can freely change the table in FIG. 8 that defines the geofence setting information, and the system adjusts a geofence setting position according to the information in the table. Note that the example in which a geofence position change based on a movement direction and a geofence distance change are performed together is described herein, but either one may be performed.

Further, in the other example embodiment, a width W of a long and narrow geofence in a longitudinal direction may be changed according to a movement speed of a moving body. For example, when a movement speed of a moving body is relatively fast (FIG. 12), the width W of the geofence may be extended, and, when a movement speed of a moving body is relatively slow (FIG. 13), the width W of the geofence may be reduced. Further, in the other example embodiment, widths W1 and W2 of a geofence protruding from a road may be changed according to a movement speed of a moving body. For example, when a movement speed of a moving body is relatively fast (FIG. 12), the widths W1 and W2 of the geofence may be extended, and, when a movement speed of a moving body is relatively slow (FIG. 13), the widths W1 and W2 of the geofence may be reduced.

Figure 14:
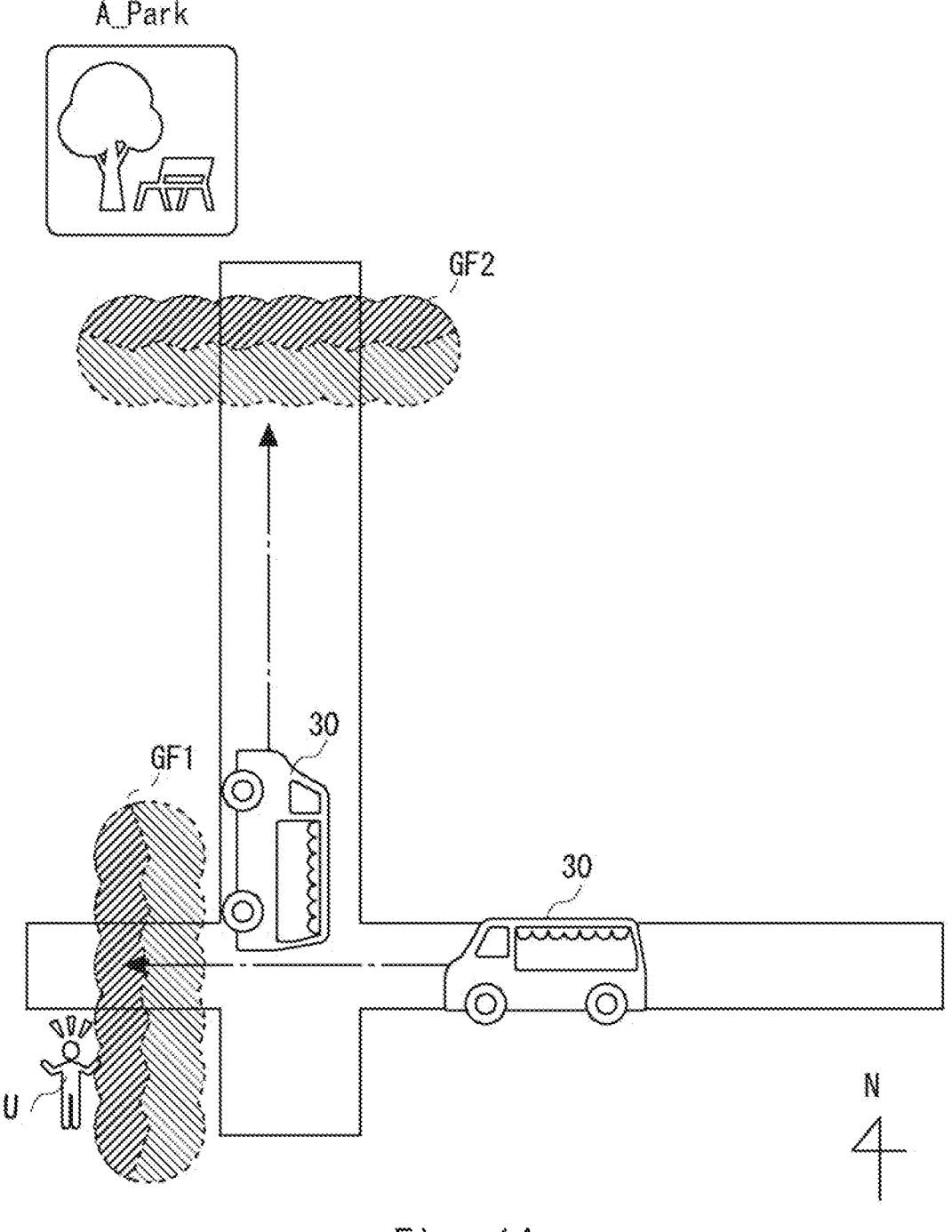
FIG. 14 is a diagram illustrating a setting example of the geofence when a scheduled traveling route of the moving body is determined.

FIG. 14 is a diagram illustrating a setting example of a geofence when a scheduled traveling route of a moving body is determined.

It is assumed that a scheduled traveling route of a kitchen car being the moving body 30 is a route extending in the western direction until a crossroad, making a right turn at the crossroad, and going north. The information provision system holds a group of scheduled traveling route information, a current position, and a traveling speed of the moving body 30. A value of the current position and the traveling speed of the moving body in the group is successively acquired and is updated. In this way, a setting position of a geofence changes. Specifically, first, when the kitchen car moves in the western direction at the beginning, the geofence GF1 is set in the western direction ahead in a traveling direction of the kitchen car. Subsequently, when a movement direction is changed to a northern direction where A park is located, the geofence GF2 is set in the northern direction with respect to positional information about the kitchen car. In this way, each time a movement direction of the moving body changes, a position and an orientation of the geofence also change. Note that the geofences GF1 and GF2 may be set in order to provide a sound content for an advertisement for announcing that "box lunch is on sale from 11 o'clock in A park" to a user terminal that enters.

In the other example embodiment, when a traveling route of a moving body is predetermined as described above, a geofence according to the scheduled traveling route may be defined.

Figure 15:
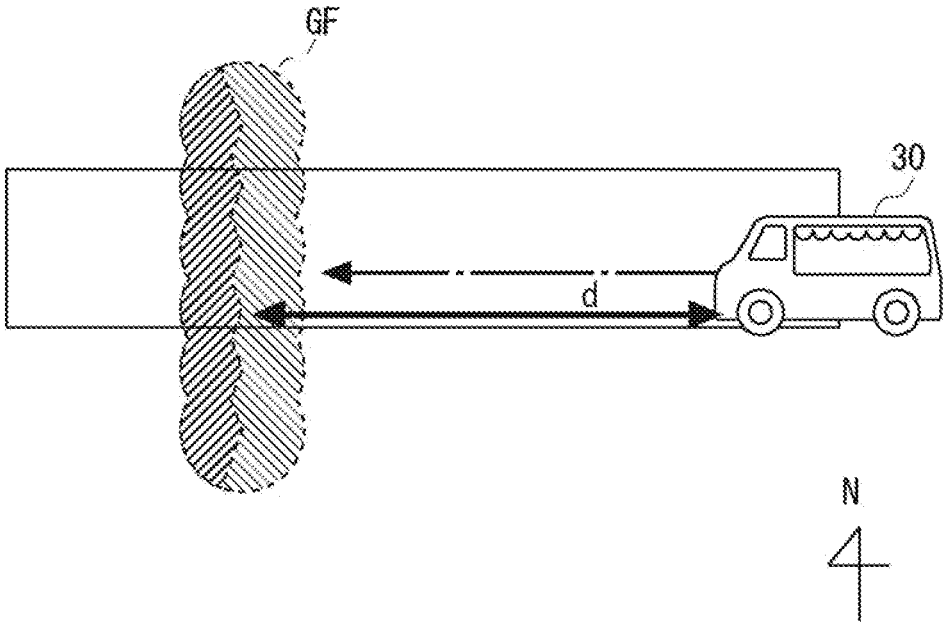
FIG. 15 is a diagram illustrating a change in a geofence position based on a movement direction.
Figure 16:
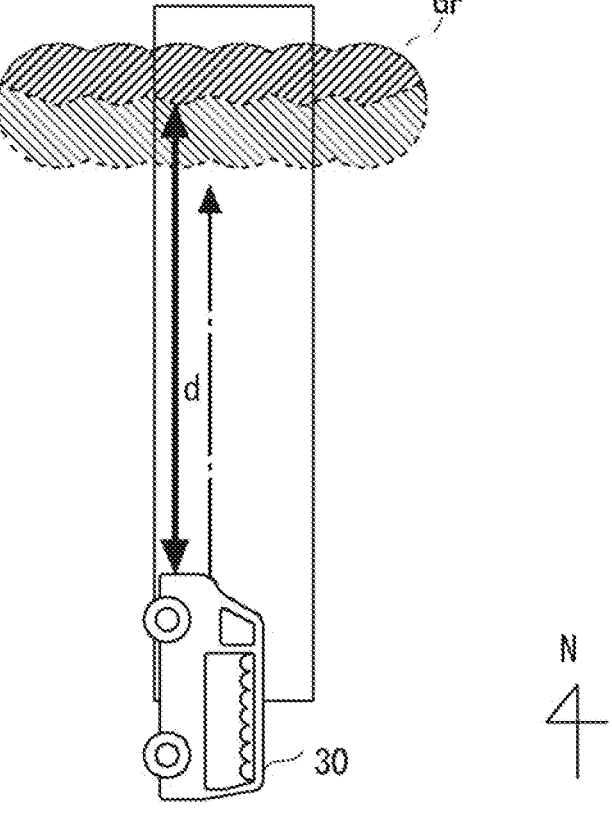
FIG. 16 is a diagram illustrating a change in a geofence position based on a movement direction.

Next, with reference to FIGS. 15 and 16, a change in a geofence position based on a movement direction will be described.

The information provision system 1 always continues to measure a position of a moving body, and detects at least a position and a movement direction of the moving body. The region setting unit 1013 changes a geofence, based on the detected positional information about the moving body and the detected movement direction of the moving body, according to preset geofence definition information. For example, when the moving body moving in the western direction as illustrated in FIG. 15 changes a position in the northern direction as in FIG. 16 at a point in time of a certain position (x, y), position coordinates at a distance d from the moving body to a geofence are changed from (x, y+d) to (x+d, y) along a movement direction of the moving body. In this way, the geofence GF is installed in front along the movement direction of the moving body 30, and thus a user can acquire an output sound content only in front of the moving body via a user terminal. Note that the example in which a geofence is set in a position ahead in a movement direction of a moving body is described herein, but FIGS. 15 and 16 merely illustrate which bearing a position of d is set with respect to the movement direction. In other words, a geofence may be set in left and right directions with respect to the movement direction of the moving body, and in the rear of the moving body. When the moving body is moving backward, a movement direction of the moving body is the rear, and thus a geofence may be set in the rear of the moving body.

Figure 17:
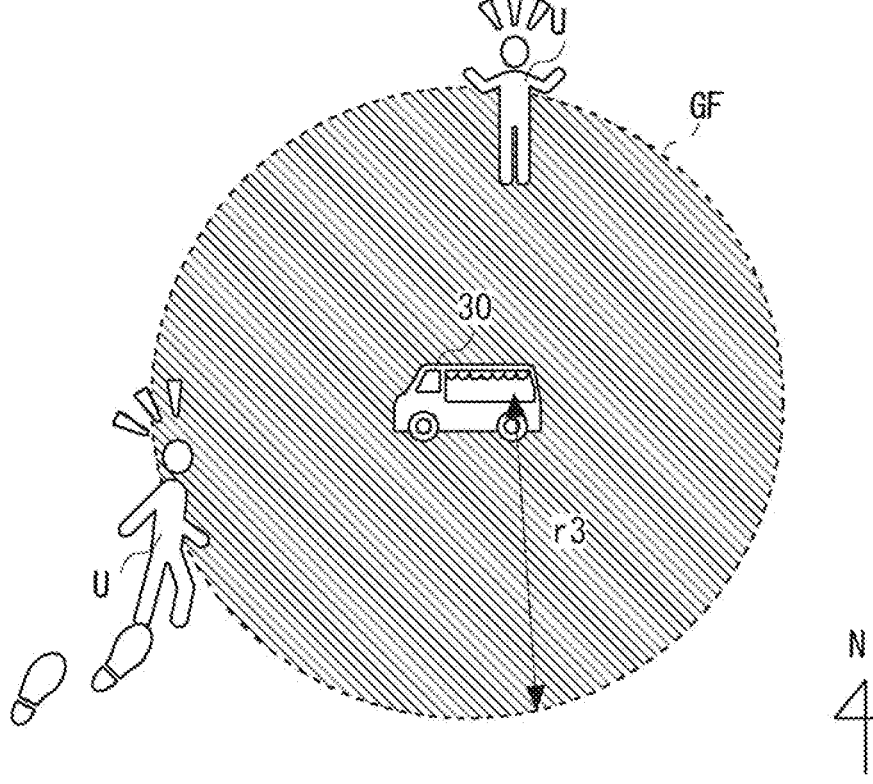
FIG. 17 is a diagram illustrating a setting example of the geofence when a movement speed is zero.

With reference to FIG. 17, a setting example of a geofence when a movement speed is zero (i.e., when a moving body stops).

When the moving body reduces a speed, a value of the distance d from the moving body to the geofence is reduced according to the movement speed. When the moving body extremely reduces a speed or stops in such a way that the value of the distance d falls below a movement speed threshold value associated with a minimum value $D_{MIN}$, a content (for example, a content C) associated with a stopping state (for example, a zero movement speed) may be provided according to the speed-specific content definition information described above. In this case, for example, as illustrated in FIG. 17, a stopping position of the moving body 30 and a surrounding region (for example, a circle having a radius $r_3$ with the moving body as the center) associated with the stopping position can be set as the geofence GF.

For example, a sound content being associated with a moving kitchen car is a sound content (for example, a content A or B in FIG. 9) that announces a scheduled stopping position and a scheduled opening time to a user. Meanwhile, a sound content (for example, the content C in FIG. 9) in the stopping state may be a sound content indicating opening and a sound content related to a menu during provision.

In this way, by not only dynamically changing setting of a geofence, based on a movement state of a target object, but also changing a classification of a sound content, a user can acquire a sound content according to a situation of a moving body.

Note that change processing of the distance d to a geofence, based on a movement speed, may be performed together with geofence position change processing or may be performed alone.

Third Example Embodiment: Content Selection Method

Next, with reference to FIG. 18, a content selection method will be described.

As described above, an example in which a user who possesses a user terminal enters a geofence being set in association with a kitchen car being a moving body will be described.

When the user approaches the kitchen car, an entry determination whether the user enters the geofence being associated with the kitchen car is performed. When a correct entry state is determined as a result of the entry determination to the geofence (YES in Step 1), the processing proceeds to next selection processing of a content (Step 2). The information provision system specifies a sound content group being associated with the moving body. When the content group includes a plurality of contents, a content according to a different piece of relative angle threshold value information may be set. Herein, the "entry state" indicates a case where it is determined that the user enters the geofence or a position of the user is in the geofence. Details of the entry determination method will be described below. Further, information about an angle threshold value used in the entry determination may be used herein or may not be used.

The information provision system 1 specifies an associated sound content classification, based on the movement state of the kitchen car (Step 2). Herein, whether direction-specific processing is necessary is determined (Step 3). When the moving body is a car, a flag that requires setting of the direction-specific processing is assumed to be set only when the car is moving. Specifically, whether the content group described above includes a relative angle-specific sound content is determined. When the relative angle-specific sound content being associated with the kitchen car is included (YES in Step 3), the specified sound content classification indicates a classification group including a plurality of sound contents.

When the relative angle-specific sound content being associated with the kitchen car is not included (NO in Step 3), the specified sound content is output (Step 6).

When the relative angle-specific sound content is included, the information provision system acquires positional information about the kitchen car and the user, and calculates a relative angle between the user and the moving body, based on the positional information. The relative angle is referred to an angle acquired by measuring clockwise a direction in which the moving body is located with reference (0°) to a front direction of the user.

With reference to the table in FIG. 10, a sound content classification being associated with the acquired relative angle and being output for the moving body is specified. Herein, it is indicated that the sound content is different by relative angle, which is not limited thereto. For example, the sound content may be a sound indicating a right direction or a sound indicating a left direction according to a relative angle. Further, in a situation where the user stops and the moving body approaches the user from the rear of the user, the geofence of the moving body may enter from a rear direction of the user. In that case, the information provision system may output a warning sound content indicating the rear direction to a user terminal.

Figure 19:
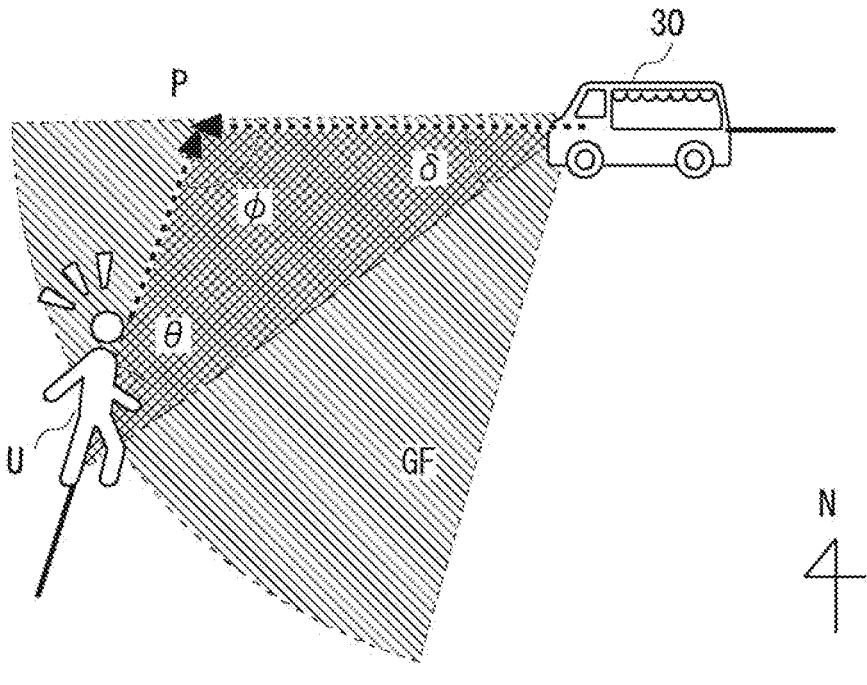
FIG. 19 is a diagram illustrating an example of outputting a right content when a relative angle falls within a predetermined range.

FIG. 19 is a diagram illustrating an example of outputting a right content when a relative angle falls within a predetermined range. As described above, the geofence GF is set ahead in a traveling direction of the moving body 30. The user U moves toward the geofence GF being associated with the moving body 30. A position of the user U and a position of the moving body are acquired over predetermined time. Processing after the user is determined to enter the geofence of the moving body is as follows. When an entry determination to the geofence being associated with the moving body is allowed, the relative angle calculation unit 1016 of the information provision system performs relative angle calculation processing.

The relative angle calculation processing is as follows.

1. A movement direction of each of the user and the moving body is calculated from a user position at a time of entry to the geofence, a movement path up to the user position, a position of the moving body, and a movement path up to the position of the moving body.
2. A latitude and a longitude of an intersection position P along a movement direction of each of the user and the moving body are calculated.
3. A triangle is drawn as illustrated in FIG. 19 from the user position, the moving body position, and the latitude and the longitude of the intersection position, and a bearing $\theta$ to the position of the moving body with respect to a user traveling direction, a bearing $\delta$ to the position of the user with respect to a movement direction of the moving body, and an angle $\varphi$ formed at the intersection point P are calculated.
4. Relative angle threshold value information being set for the moving body is referred, and sound content information associated with the acquired relative angle $\theta$ is selected.

A point where a straight line of the traveling direction of the user U and a straight line of the traveling direction of the moving body 30 intersect is assumed to be P. A bearing formed by a straight line of the traveling direction of the user U and a straight line connecting the user and the position of the moving body is assumed to be $\theta$. When the angle $\theta$ is calculated and $\theta$ falls within a predetermined range (for example, $-30$ degrees$<\theta<-180$ degrees), an information provision control unit 1017 outputs a right content to a user terminal of the user U in the information provision system. The right content may be, for example, a sound content in such a way that a sound source is set on a right side from the user. The right content may be a sound content that notifies the user that the moving body approaches from the right side.

Figure 20:
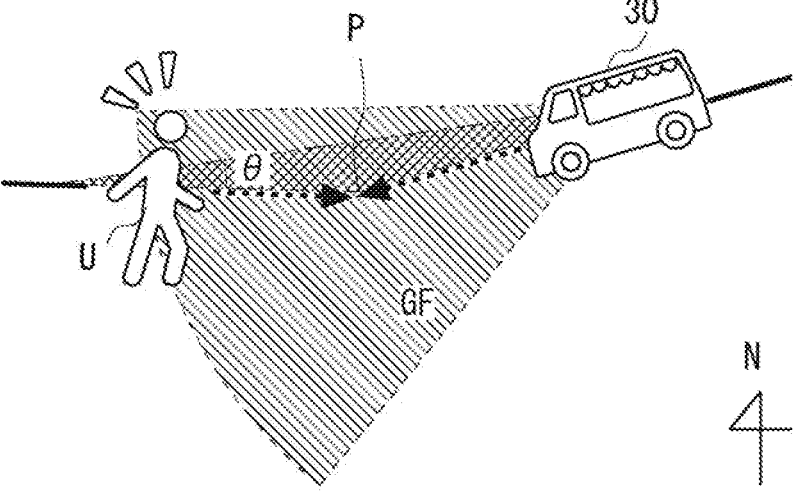
FIG. 20 is a diagram illustrating an example of outputting a front content when a relative angle falls within a predetermined range.

FIG. 20 is a diagram illustrating an example of outputting a front content when a relative angle falls within a predetermined range. Similarly to FIG. 19, when the angle $\theta$ formed between a straight line of the traveling direction of the user U and a straight line connecting the user and the position of the moving body is calculated, and $\theta$ falls within a predetermined range (for example, $-30$ degrees$<\theta<30$ degrees), the information provision control unit 1017 outputs a front content to the user terminal of the user U in the information provision system. The front content may be, for example, a sound content in such a way that a sound source is set on the front from the user. The front content may be a sound content that notifies the user that the moving body approaches from the front.

Figure 21:
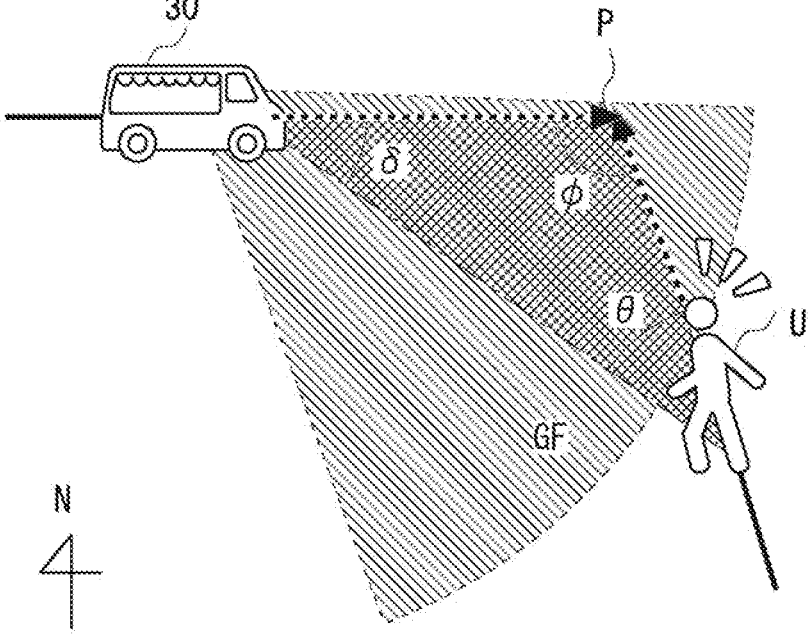
FIG. 21 is a diagram illustrating an example of outputting a left content when a relative angle falls within a predetermined range.

FIG. 21 is a diagram illustrating an example of outputting a left content when a relative angle falls within a predetermined range. Similarly to FIG. 19, when the angle $\theta$ formed between a straight line of the traveling direction of the user U and a straight line connecting the user and the position of the moving body is calculated, and $\theta$ falls within a predetermined range (for example, $30$ degrees$<\theta<180$ degrees), the information provision control unit 1017 outputs a left content to the user terminal of the user U in the information provision system. The left content may be, for example, a sound content in such a way that a sound source is set on a left side from the user. The left content may be a sound content that notifies the user that the moving body approaches from the left side.

Note that, in the description above, a relative angle is measured based on a user position and a moving body position, but a bearing to a position of a moving body with respect to an orientation of a head of a user may be used instead of a relative angle when the orientation of the head can be detected. In FIGS. 19 to 21, a center point of the geofence is a position of the moving body 30 for convenience, but the geofence is actually installed in front at a predetermined distance from the moving body.

Figure 18:
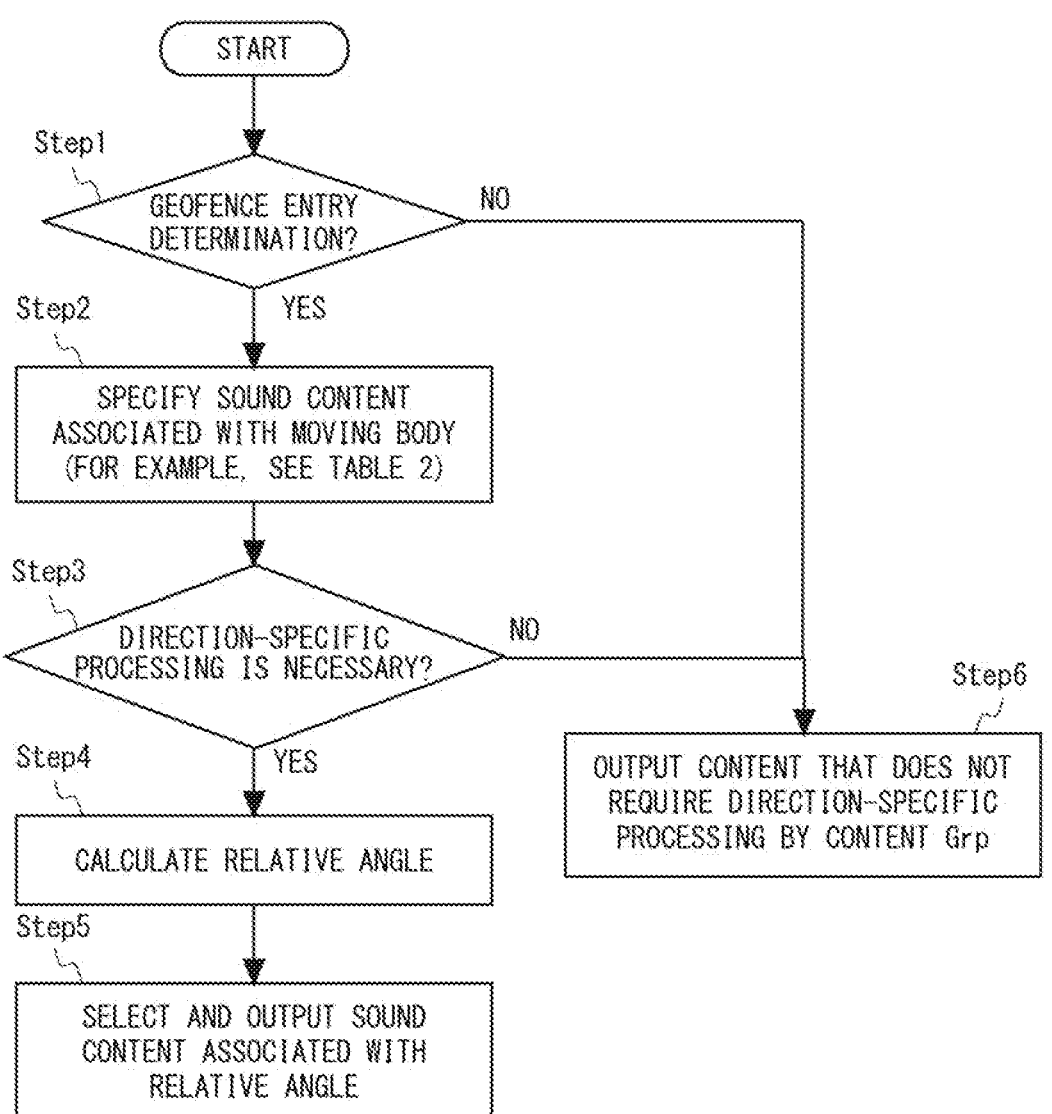
FIG. 18 is a flowchart illustrating a selection method of a content according to a third example embodiment.

Further, in the description above, the angle-specific sound content selection is performed after a sound content classification group is selected according to a movement speed in Step 2 in FIG. 18, but the selection may be omitted. For example, in a case of a publicity car and the like assumed that a change in a movement speed hardly occurs, a fixed geofence may always be set for the moving body, and selection of a relative angle-specific sound content may be performed.

Figure 22:
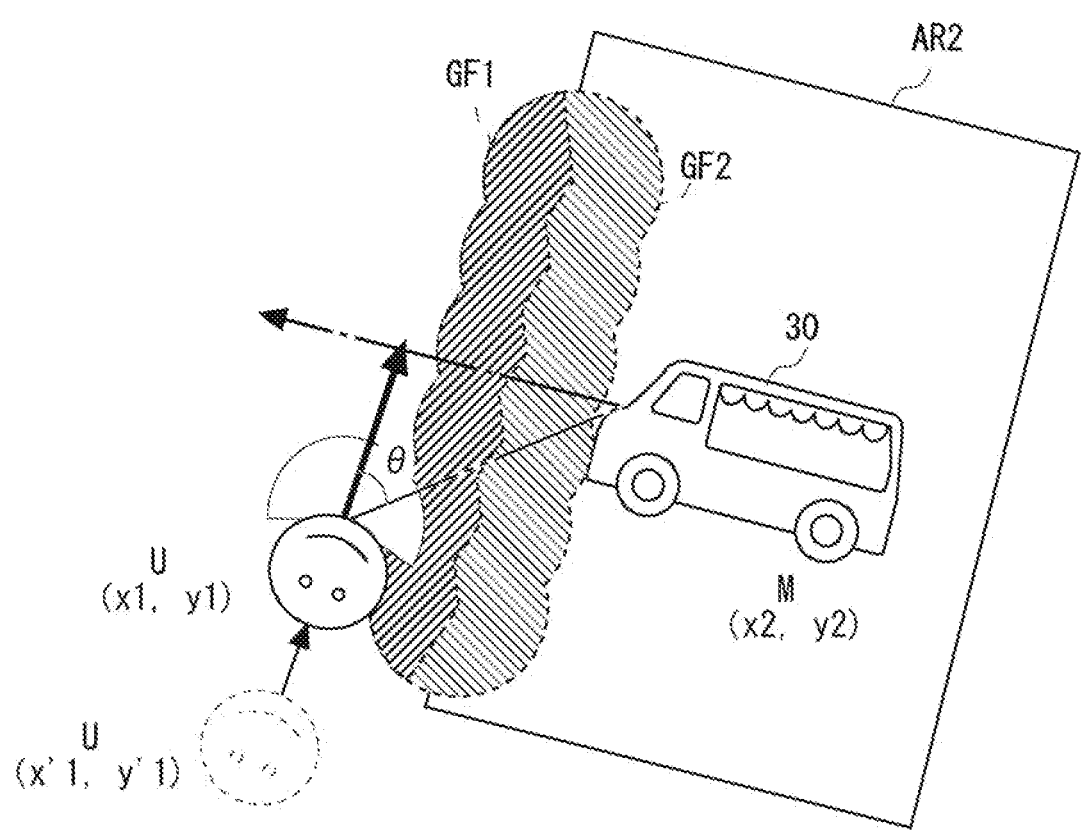
FIG. 22 is a diagram illustrating another example of calculating a relative angle.

With reference to FIG. 22, another relative angle calculation method will be described.

It is assumed that all users who are allowed by a geofence entry determination are a sound output target. Thus, a user position at a point in time at which the user enters the geofence and a position of a moving body with respect to the user position can be calculated, and an angle acquired by the positions at the two points can be set as a relative angle $\theta$. A region AR2 including the moving body and the geofence GF2 illustrated in FIG. 22 are regions where a sound is not output. Note that, in some example embodiments, a shape of the geofence may be a shape of only the geofence GF1 without the geofence GF2. Further, when an entry determination using an angle threshold value is performed on the geofence described below, a sound content may be output when the user enters the geofence GF1, and a sound content may not be output when the user enters the geofence GF2. Various pieces of information used for calculating the relative angle θ are as follows.

User position: (x1, y1)
Moving body position: (x2, y2)
Relative angle θ between user and moving body=(y2−y1)/(x2−x1)

When a movement direction of the user is $\theta_0$, it is assumed that $\theta_1$ indicates a left sound source associated angle threshold value, and $\theta_2$ indicates a right sound source associated angle threshold value. The calculated relative angle θ and a content to be output are as follows.

When $\theta_2 < \theta < \theta_0$, a right content is output.
When $\theta_0 < \theta < \theta_1$, a left content is output.
$\theta_1$ and $\theta_2$ are defined as any value by a moving body.

In the example embodiments described above, the setting method of a geofence related to a moving body and the provision method of a content are mainly described, but the example embodiments can be combined with an example embodiment related to a fixed target object such as a shop and a facility as indicated below.

Figure 23:
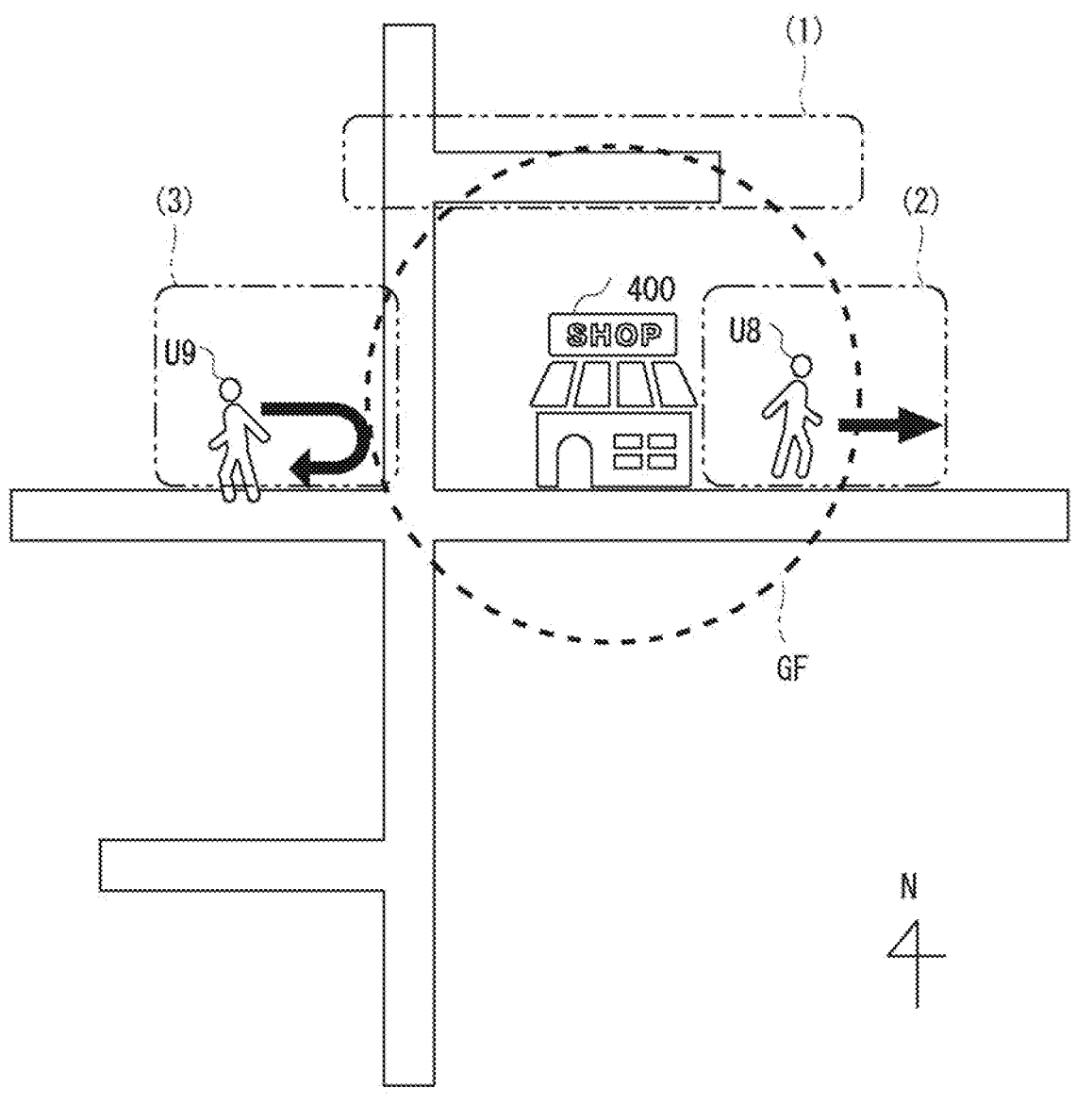
FIG. 23 is a diagram illustrating a setting method of a geofence according to a comparative example and a problem thereof.

FIG. 23 is a diagram illustrating a setting method of a geofence according to a comparative example and a problem thereof.

Herein, the geofence GF is set for a facility 400 (for example, a shop).

In the comparative example, the geofence GF having a circular shape is set with the facility 400 as the center. In other words, a region having a predetermined radius is set as the geofence with coordinates (a latitude and a longitude) of the facility 400 as the center. In this way, by inputting the latitude and the longitude of the facility and the radius of the geofence to the information provision system, the geofence is easily set in such a way as to include the facility in the geofence. When the position detection unit 208 (for example, a GPS receiver) of a user terminal carried by a user detects that the user enters the geofence GF, information (for example, a coupon, event information, and the like) about the facility 400 is provided to the user terminal. However, three problems as follows occur when a service for providing sound data to a user terminal is developed.

(1) When a part of a region of a geofence overlaps even a road that is not located on a path of flow to the shop, a sound service is also inappropriately provided to a user that does not need to be a target. It is difficult to set a radius of the geofence in order to avoid such false detection.

(2) A sound service is also inappropriately provided to a user U8 who moves away from the shop.

(3) A sound service is also inappropriately provided to a user U9 who enters the geofence and suddenly changes a direction.

In addition to the problems above, a measurement error (approximately 10 m) of the GPS cannot be avoided particularly in a service using the GPS. Thus, the geofence needs to be set in consideration of the measurement error in order to appropriately provide information.

Figure 24:
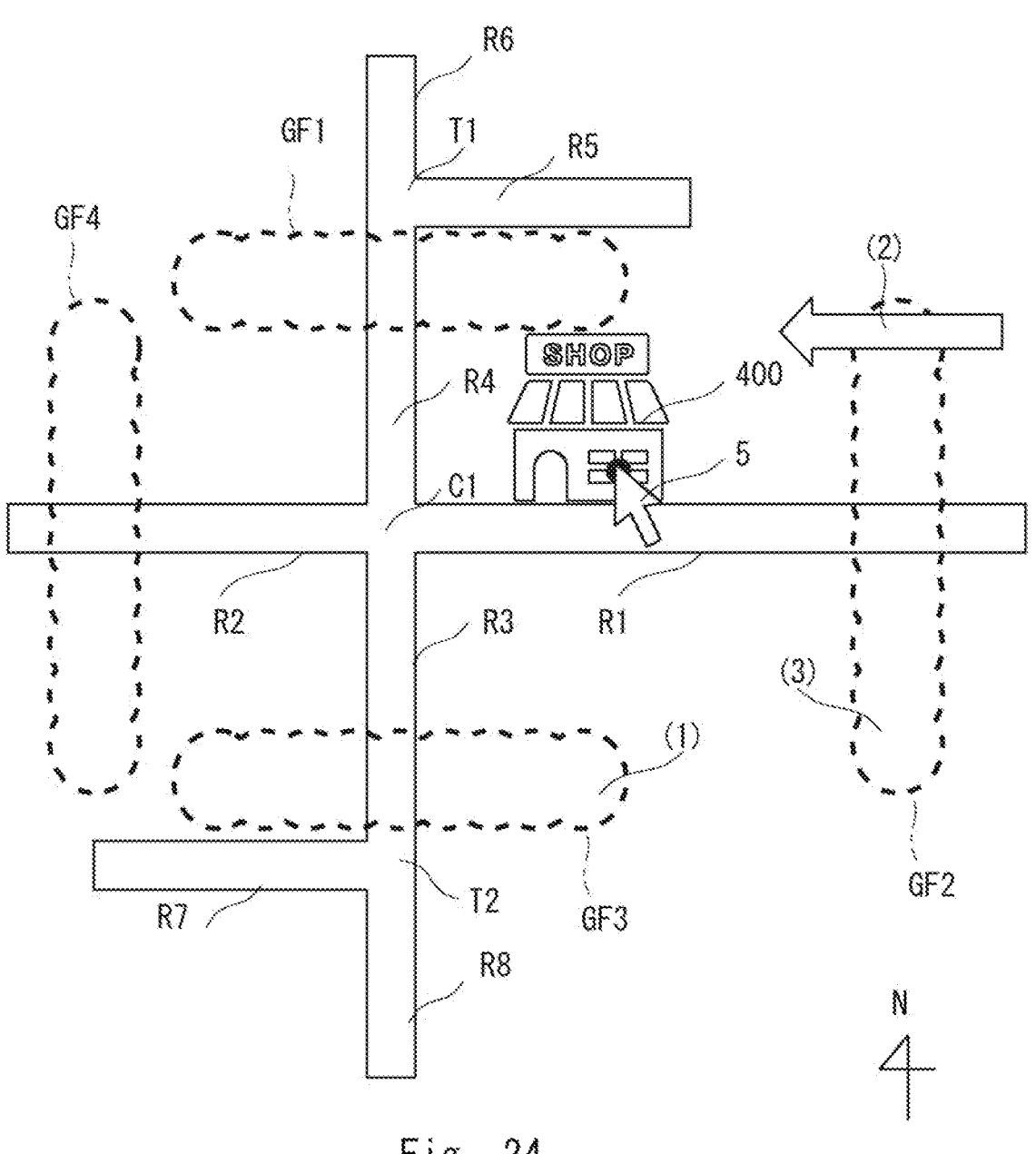
FIG. 24 is a diagram illustrating a setting method of a geofence according to some example embodiments.

FIG. 24 is a diagram illustrating a setting method of an exemplary geofence according to some example embodiments.

In a sound service, when a user enters the geofence, a sound service (having a predetermined time) related to a shop is provided to the user via a user terminal.

Methods for solving the three problems described above are as follows.

(1) Geofences GF1, GF2, GF3, and GF4 are disposed in a position at a predetermined distance from the shop on a path of flow to the shop by the user. In order to smoothly guide the user to the shop, it is preferable that the user arrives the shop almost simultaneously with an end of the sound service of the predetermined time.

(2) An entry direction to the geofence is set. In this way, a sound service of a facility on an opposite side to the entry direction to the geofence is not provided. A sound service can be prevented from being provided to a user who moves away from the shop.

(3) In entry detection to the geofence, it is confirmed that a user stays in the geofence for a fixed period of time, and then a sound service is provided. In this way, a sound service can be prevented from being provided to a user who suddenly changes a direction.

A method for solving each of the problems will be specifically described below.

Figure 25:
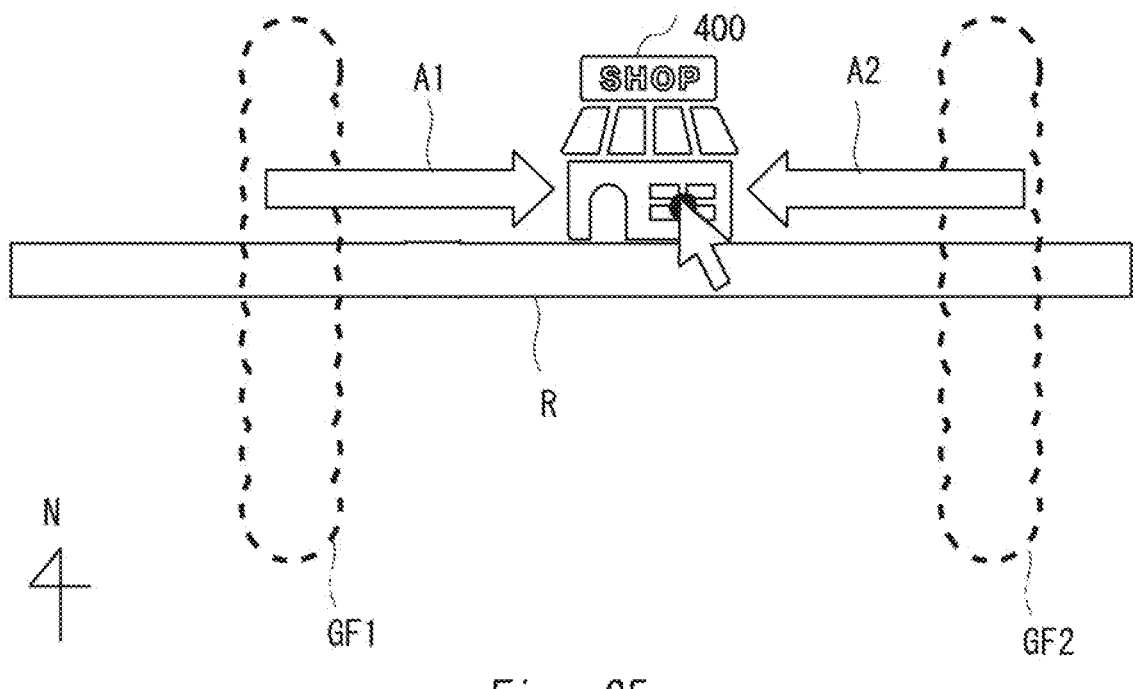
FIG. 25 is a diagram illustrating a setting method of the geofence according to some example embodiments.

FIG. 25 illustrates an example of setting the geofences GF1 and GF2 at a predetermined distance from the facility 400.

As illustrated in FIG. 25, an unforked road R extends to the left and the right in front of the facility 400. By assuming that a customer of the shop being a user arrives the shop through the road R, two geofences GF1 and GF2 are set in positions at the predetermined distance from the shop. An arrow A1 and an arrow A2 in FIG. 25 schematically indicate a start and an end of a sound service. When entry of the user to the geofence is detected from positional information about a user terminal, the sound service starts, and the sound service ends just upon arrival of the user at the shop in accordance with a walking speed of the user. In other words, a distance between the shop and the geofence is freely set in consideration of a predetermined time of a content such as the sound service and the walking speed of the user. The walking speed may be set in consideration of age, gender, and the like of the user. A server 10 may dynamically change a distance between the facility (shop) and the geofence in consideration of age, gender, and the like of the user by acquiring a user ID and a terminal ID. Further, the geofence may be set in such a way as not to overlap the facility.

Further, as illustrated in FIG. 25, the geofences GF1 and GF2 are set in such a way as to be elongated in a substantially perpendicular direction to the road. The reason is that a measurement error by the GPS is considered. Although not illustrated, many buildings and high-rise buildings are normally present along the road. Thus, it is conceivable that a deviation of the GPS due to reflection by the building tends to be great in the perpendicular direction to the road.

A long and narrow shape of the geofence can be a suitable long and narrow shape including a rectangular shape, an elliptic shape, and a combination of a plurality of circular shapes (described below in FIG. 26). When a rectangular geofence is set, coordinates (latitude/longitude information) of four points may be input.

Note that, in the present example, an unforked road extending to the left and the right to a shop is assumed, but, when one road of left and right roads is a dead end or the like and cannot be passed, a geofence can be set only on a road on an opposite side.

Figure 26:
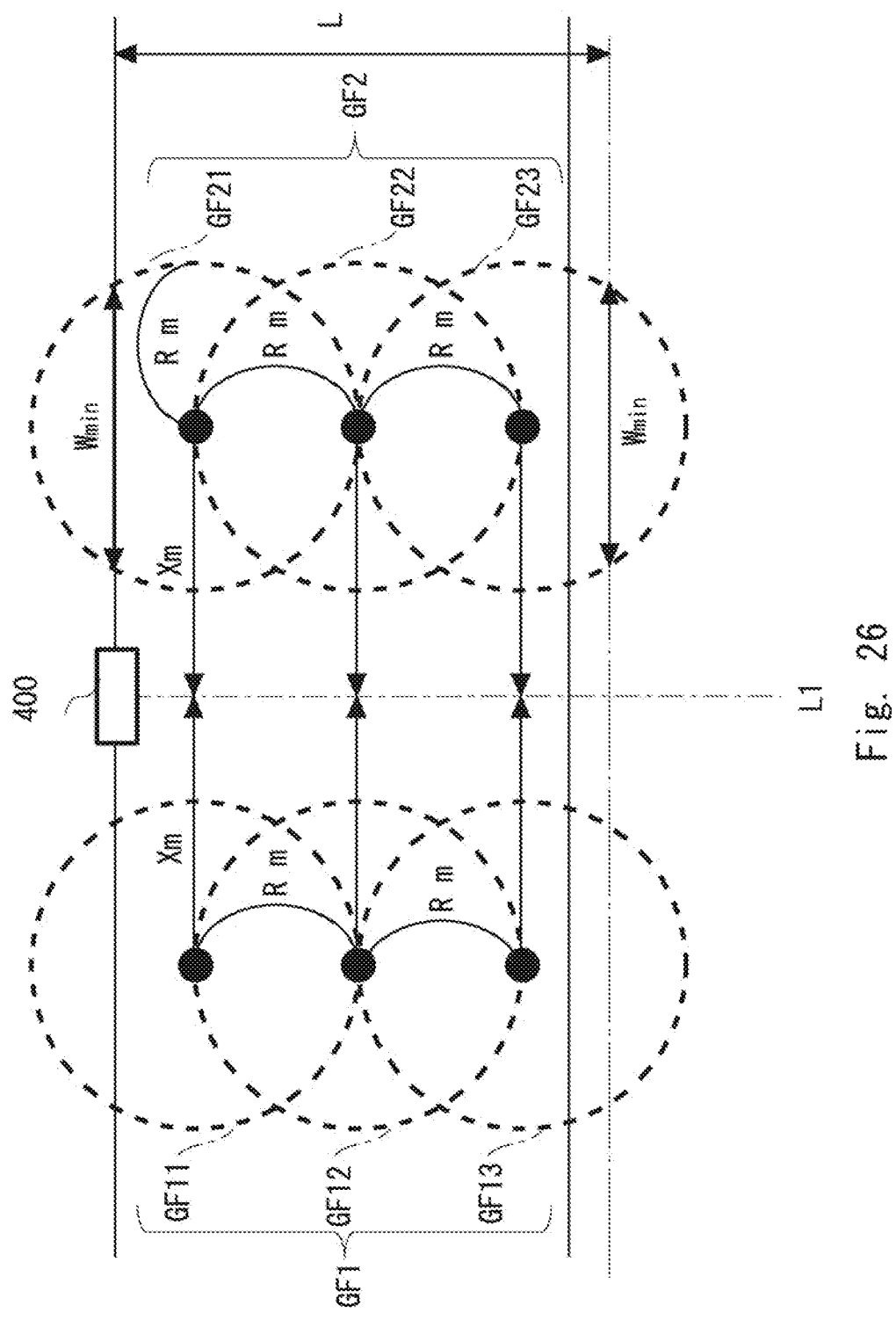
FIG. 26 is a diagram illustrating a setting method of the geofence according to some example embodiments.

FIG. 26 is a detailed diagram of an exemplary geofence having a long and narrow shape. In FIG. 26, an unforked road as illustrated in FIG. 25 is assumed, and the geofence is set.

A geofence GF11 having a circular shape having a radius Rm with, as the center, a position at a distance of Xm in a direction perpendicular to a line L1 extending from the target facility 400 is installed. A geofence GF12 that overlaps the geofence GF11 by being shifted by the predetermined radius Rm and has a circular shape having the radius Rm is installed. Furthermore, a geofence GF13 that overlaps the geofence GF12 by being shifted by Rm and has a circular shape having the radius Rm is installed. In this way, the plurality of geofences GF11, GF12, and GF13 having a circular shape are formed into a group, and a long and narrow geofence GF1 is formed.

Similarly, a plurality of geofences GF21, GF22, and GF23 having a circular shape are installed on an opposite side to the plurality of geofences GF11, GF12, and GF13 having a circular shape with respect to the line L1. In other words, the geofence GF21 having a circular shape having the radius Rm with, as the center, a position at a distance of Xm in the direction perpendicular to the line L1 extending from the target facility 400 is installed. The geofence GF22 that overlaps the geofence GF21 by being shifted by the predetermined radius Rm and has a circular shape having the radius Rm is installed. Furthermore, the geofence GF23 that overlaps the geofence GF22 by being shifted by Rm and has a circular shape having the radius Rm is installed. In this way, the plurality of geofences GF21, GF22, and GF23 having a circular shape are formed into a group, and a long and narrow geofence GF2 is formed.

As described above, by using a long and narrow geofence, even when an error of the GPS occurs, content information can be appropriately provided to a user terminal.

In FIG. 26, three circular geofences are formed into a group as one geofence, but two or more circular geofences may be formed into a group in consideration of a path of flow of a pedestrian and a road width.

In the present example, it is assumed that the distance Xm from the facility 400 to the center of the circular geofence is approximately 15 m, and the radius of the circular geofence is approximately 3 m. It is preferable that an overlapping portion (a minimum width in FIG. 26) of an adjacent circular geofence is equal to or more than 4.5 m. A length L of the long and narrow geofence in the longitudinal direction is assumed to be equal to or less than 10 m. It is preferable that the long and narrow geofence is extended from each of both ends of a road (or a walking area) by at least the same length as a road width (or a width of the walking area). Further, when the long and narrow geofence is rectangular, a rectangle having a length in the longitudinal direction of equal to or less than 10 m and a width of equal to or more than 4.5 m can be set. Note that these are determined in consideration of a road width, an average walking speed of a pedestrian, a measurement interval (approximately 1 second interval) of the GPS, time of a content, and the like, and the present disclosure is not limited to these.

As described above, for example, a predetermined distance for setting a region is determined based on a reproduction time length of sound data. Thus, when the reproduction time length of the sound data are changed by updating the sound data stored in a content database of a storage unit 102, adding or deleting a part, and the like, a control unit 101 may accordingly change the predetermined distance between a facility and a geofence.

In the example described above, an unforked road in front of a shop is assumed to be a walking area. However, an area (including a sidewalk) assumed to be walked by a pedestrian can be determined as a walking area regardless of an actual road width, and a geofence can be set in accordance with the walking area. When an area assumed to be walked by a pedestrian (user) like a theme park is wide, for example, a path connecting an entrance of the theme park and an entrance of an attraction reserved by the user may be determined as a walking area.

The length L of the long and narrow geofence in the longitudinal direction can be determined in consideration of a width of the walking area and a measurement error of the GPS. In other words, the length L of the long and narrow geofence in the longitudinal direction is preferably extended from both ends of the width of the walking area toward the outside of both the ends by a predetermined width that permits the measurement error. In other words, on an assumption that the GPS measurement error is 10 m, the length L of the long and narrow geofence in the longitudinal direction has a length of 20 m in addition to the width of the walking area. More preferably, the length L may be extended from both the ends of the width of the walking area toward the outside of both the ends by the measurement error of the GPS.

Figure 27:
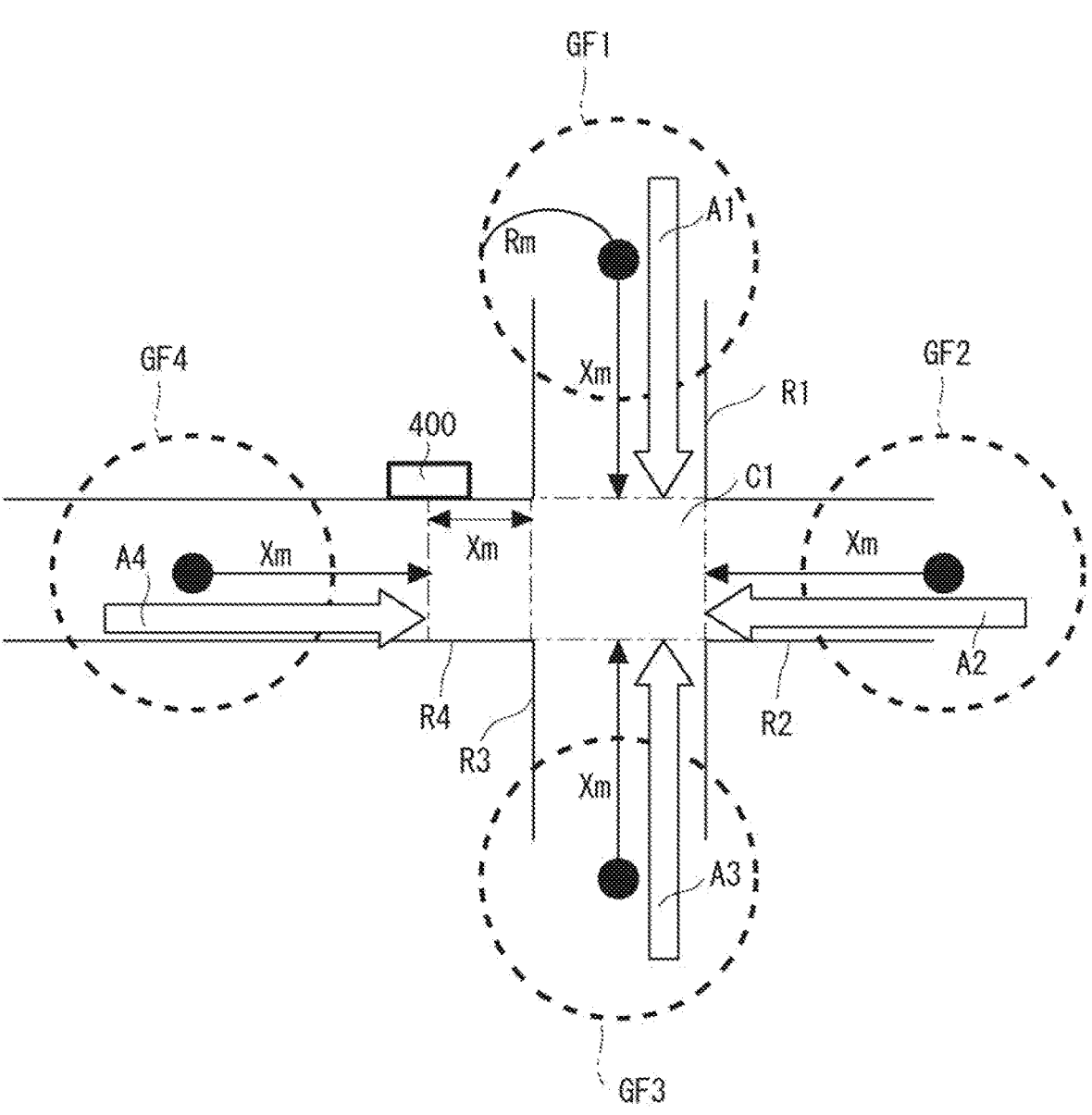
FIG. 27 is a diagram illustrating a setting method of the geofence according to an example embodiment.

FIG. 27 illustrates an example of setting the geofences GF1, GF2, GF3, and GF4 at a predetermined distance from the facility in road networks R1, R2, R3, and R4 including an intersection point C1. Also in the present example, as described above, the geofence is set in the position at the predetermined distance from the target facility 400. However, when the facility is provided along the road R4 near a fork (within a predetermined distance from a fork) such as an intersection point and a T-junction, the geofence is installed on each of the forked roads R1, R2, and R3 (roads away from the road on which the facility is present). In other words, as illustrated in FIG. 27, when the facility 400 is located at a predetermined distance Xm from the intersection point C1, the geofence GF2 is installed on the road R2 on an opposite side to the facility 400 with respect to the intersection point C1, the geofence GF3 is installed on the road R3 making a right turn at the intersection point from the facility 400, and the geofence GF1 is installed on the road R1 making a left turn at the intersection point from the facility 400.

In other words, when a path to the facility is forked (for example, an intersection point, a T-junction, and the like), the geofences GF1, GF2, and GF3 are set in a position at the predetermined distance (Xm) from the front of the fork. In other words, when there is a fork within a predetermined distance on the path from a target object (facility), it can be said that a geofence (region) is set in a position on the path at a second predetermined distance being a distance longer than the predetermined distance with respect to the target object. The second predetermined distance is set longer than the predetermined distance by a path that passes through the fork.

Further, arrows A1 to A4 in FIG. 27 indicate that a content such as a sound service is being reproduced. As indicated by the arrows A1, A2, and A3, reproduction of the content ends before a user enters the intersection point C1 where the user may approach the facility 400 via the fork. Further, as indicated by the arrow A4, when a pedestrian walks on the road R4 on which the facility is present, reproduction of the content ends in front of the facility. In this way, the geofence is installed before the path to the facility is forked and reproduction of the content related to the facility ends before the fork, and thus unnecessary information can be prevented from being provided to a user who does not reliably move to the facility.

As illustrated in FIG. 24, in the information provision system 1, the user puts a cursor 5 on the target facility 400 in map information displayed on a display and clicks a mouse, and thus the geofence may be automatically appropriately set.

Note that, in FIG. 27, the circular geofences GF1 to GF4 are used for convenience of description, but, as described above, a measurement error of the GPS can be covered by forming the geofences GF1 to GF4 elongated in the substantially perpendicular direction to the road.

Next, with reference to FIG. 28, a setting method of an entry direction to a geofence will be described.

Figure 28:
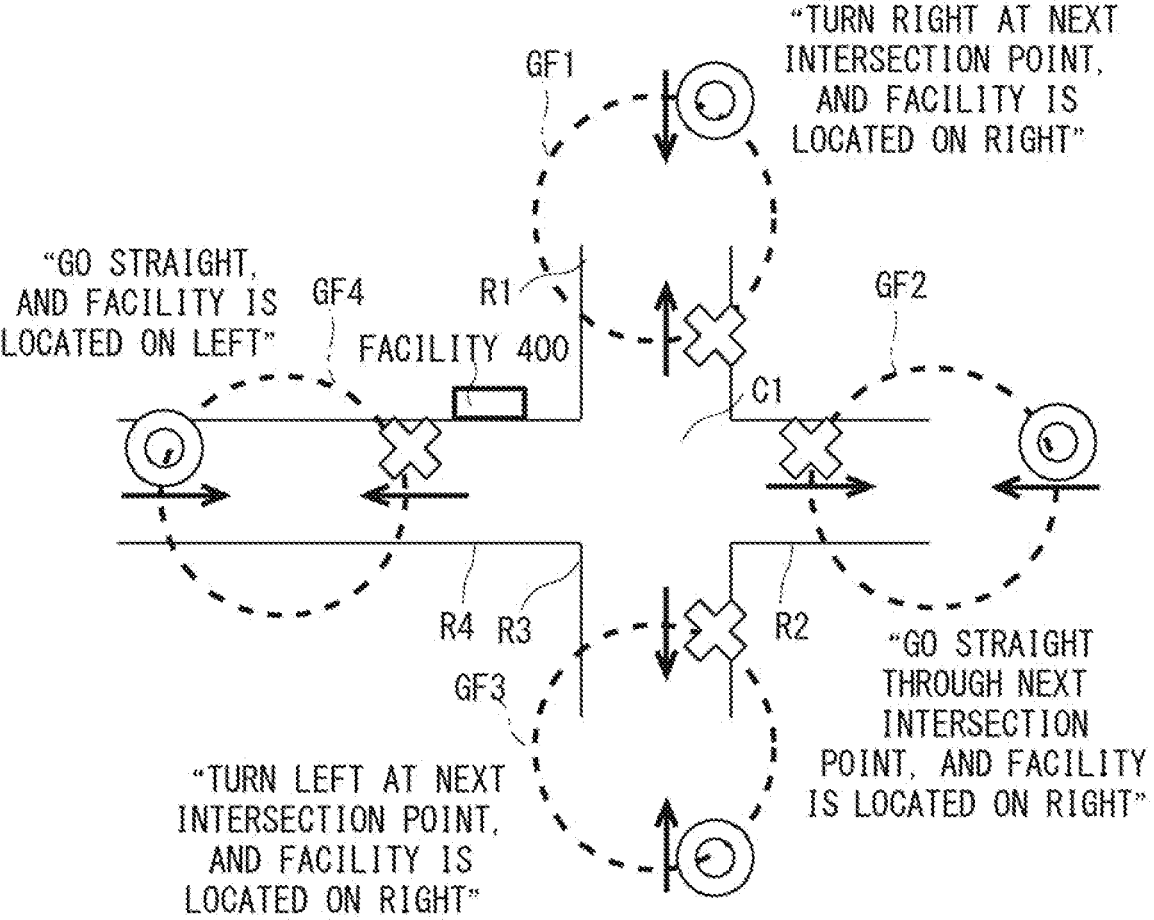
FIG. 28 is a diagram illustrating a setting method of an entry direction to the geofence.

FIG. 28 illustrates a geofence having a circular shape for simplifying the drawing, but a geofence having a long and narrow shape extending from a road width as described above may be used.

As illustrated in FIG. 28, in all the geofences GF1 to GF4, a direction toward the facility 400 (i.e., a direction toward the intersection point C1) is determined as an entry direction (indicated by ○ in FIG. 28). Thus, a sound service is provided to a user terminal of a user who enters from the entry direction. A content of a sound service related to the facility 400 may be determined to be different for each geofence. For example, a sound service being reproduced when the user enters the geofence GF1 can announce that "turn right at next intersection point, and facility is located on right". A sound service being reproduced when the user enters the geofence GF2 can announce that "go straight through next intersection point, and facility is located on right". A sound service being reproduced when the user enters the geofence GF3 can announce that "turn left at next intersection point, and facility is located on right". Furthermore, a sound service being reproduced when the user enters the geofence GF4 can announce that "go straight, and facility is located on left".

Meanwhile, a direction away from the facility 400 (i.e., a direction away from the intersection point C1) is determined as a non-entry direction (indicated by x in FIG. 28), and a sound service is not provided to a user who enters from the non-entry direction.

Figure 29:
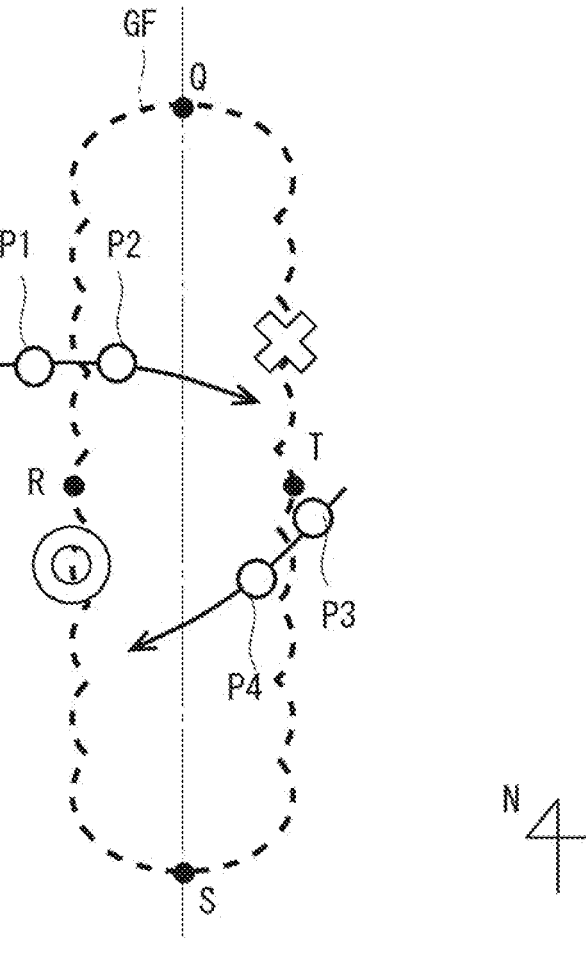
FIG. 29 is a diagram illustrating a determination method of an entry direction to the geofence.

FIG. 29 is a diagram illustrating a method for determining an entry direction of a user to a geofence.

Note that, in the present information provision system, a GPS measurement interval is described as an approximately 1 second interval, but any measurement interval may be set.

It is assumed that, when a user who possesses a user terminal enters the geofence GF, the user travels from a position P1 to a position P2 by the GPS. In that case, an entry angle θ from the position P1 to the position P2 is calculated with reference to a predetermined direction (northern direction in the present example). When the calculated entry angle falls within a predetermined angle threshold value, for example, 180 degrees<θ<360 degrees, the user can be considered to enter the geofence from an appropriate entry direction (indicated by ○ in FIG. 29).

On the other hand, it is assumed that, when a user who possesses a user terminal enters the geofence GF, the user travels from a position P3 to a position P4 at a measurement interval (approximately 1 second) of the GPS. In that case, an entry angle θ from the position P3 to the position P4 is calculated with reference to a predetermined direction (northern direction in the present example). When the entry angle falls within a predetermined angle threshold value, for example, 0 degrees<θ<180 degrees, the user can be considered to enter the geofence from an inappropriate entry direction (non-entry direction, indicated by x in FIG. 29).

Alternatively, as a modification example, an entry direction of a user may be determined as follows. First, as illustrated in FIG. 29, a part QRS of a boundary line of the geofence GF is determined as an entry boundary line, and a part QTS of the boundary line of the geofence GF is determined as a non-entry boundary line.

It is assumed that, when a user who possesses a user terminal enters the geofence GF, the user travels from the position P1 to the position P2 at a measurement interval (approximately 1 second) of the GPS. In this case, the user enters across the entry boundary line QRS of the geofence GF, and thus the control unit 101 can determine that the user enters from the entry direction being predetermined for the geofence. In this case, content information is provided.

On the other hand, it is assumed that, when a user who possesses a user terminal enters the geofence GF, the user travels from the position P3 to the position P4 at a measurement interval (approximately 1 second) of the GPS. In that case, the user enters across the entry boundary line QTS of the geofence GF, and thus the control unit 101 can determine that the user enters from the non-entry direction being determined for the geofence. In this case, content information is not provided.

Figure 30:
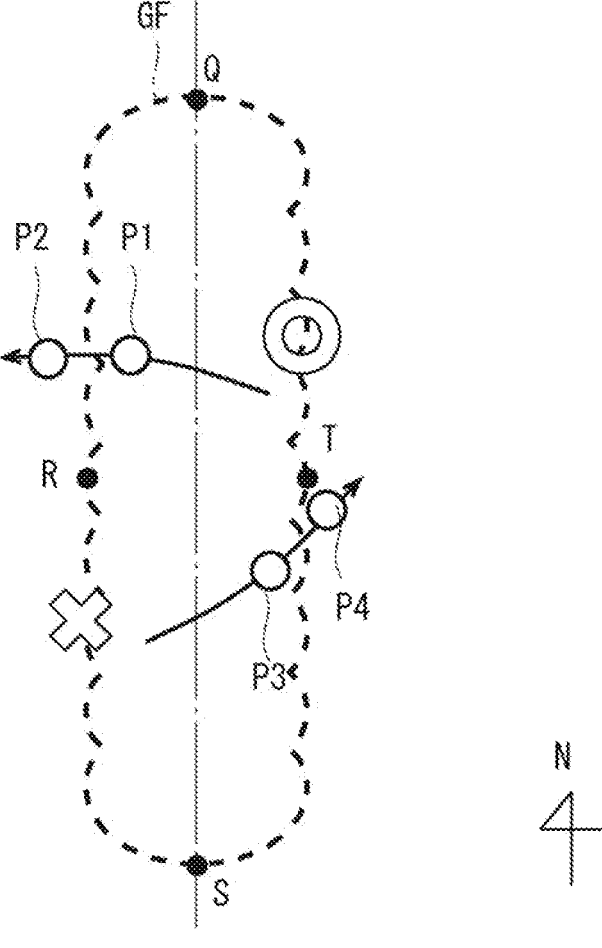
FIG. 30 is a diagram illustrating a determination method of an exit direction from the geofence.

FIG. 30 is a diagram illustrating a method for determining an exit direction of a user from a geofence.

Next, it is assumed that, when a user who possesses a user terminal exits from the inside of the geofence GF to the outside, the user travels from a position P1 to a position P2 by the GPS. An exit angle θ from the position P1 to the position P2 is calculated with reference to a predetermined direction (northern direction in the present example). When the calculated exit angle falls outside an exit angle threshold value (for example, 180 degrees<θ<360 degrees), the user can be considered to exit from the geofence in an inappropriate exit direction (non-exit direction, indicated by x in FIG. 30). In this case, content information is not provided.

On the other hand, it is assumed that, when a user who possesses a user terminal exits from the inside of the geofence GF to the outside, the user travels from a position P3 to a position P4 at a measurement interval (approximately 1 second) of the GPS. In that case, an exit angle θ from the position P3 to the position P4 is calculated with reference to a predetermined direction (northern direction in the present example). When the exit angle falls outside an exit angle threshold value (for example, 0 degrees<θ<180 degrees), the user can be considered to exit from the geofence in an appropriate exit direction (indicated by ○ in FIG. 30). In this case, content information is provided.

As described above, a content provider can set a predetermined entry angle threshold value and a predetermined exit angle threshold value for a geofence. The control unit 101 of the server 10 can continuously receive positional information from a user terminal 20, calculate an entry angle to a geofence and an exit angle from the geofence, and determine an appropriate entry direction and an appropriate exit direction. In this way, the control unit 101 of the server 10 can provide appropriate content information to the user terminal 20.

Note that, in the example described above, an entry direction is determined from measurement values at two points at a measurement interval before and after entry to a geofence, but an entry direction may be determined from measurement values at two points or more, for example, three points or four points.

FIG. 31 is a table illustrating an adjustment value for each time period.

As illustrated in FIG. 31, any adjustment value is set for each time period. The adjustment value (a to e in FIG. 31) may take on any value. Further, the adjustment value may be 0. A time acquisition unit 1018 of the control unit 101 acquires a time (for example, 10:20) when positional information from the user terminal 20 enters a geofence. The control unit 101 acquires an adjustment value (for example, b) in a time period (for example, 7:00 to 11:00) being associated with the acquired time. An adjustment unit of the control unit 101 multiplies the entry angle threshold value described above by an adjustment value, and adjusts the entry angle threshold value. A road on which a geofence is set varies in a degree of congestion for each time period. For example, in a situation (for example, a road is not crowded) where a user can relatively walk straight, an adjustment value may be set in such a way that an angle threshold value is narrower. On the other hand, in a situation (for example, a road is crowded) where a user is likely to weave, an adjustment value may be set in such a way that an angle threshold value is wider.

Note that, in the example described above, an entry angle threshold value is multiplied by an adjustment value, but an adjustment value (a positive value or a negative value) may be added to an entry angle threshold value. Further, an adjustment value may be used for not only an entry angle threshold value but also an exit angle threshold value. An adjustment value may be different for an entry angle threshold value and an exit angle threshold value.

Note that the time period illustrated in FIG. 31 is merely an example, and can be freely set.

As a modification example, the control unit 101 may acquire accuracy of the GPS, and perform control in such a way as to increase an adjustment value for an angle threshold value when the accuracy of the GPS is worse than an accuracy threshold value.

As another modification example, the control unit 101 of the server 10 may acquire a schedule of a user from a calendar application of the user terminal 20, and change an adjustment value for an angle threshold value according to the acquired schedule of the user. For example, with the schedule, an adjustment value may be increased.

By just determining only an entry direction, a sound service is also inappropriately provided to a user who enters a geofence and then suddenly changes a direction. Thus, a method for solving the problem will be described.

Figure 32:
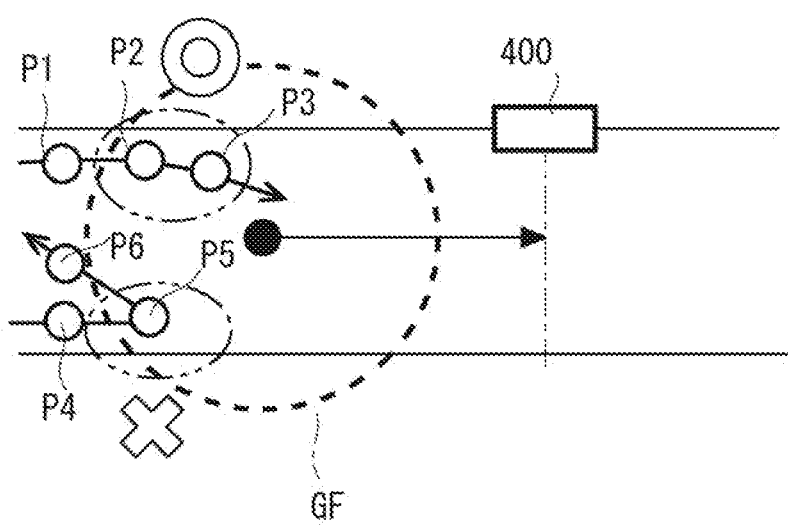
FIG. 32 is a diagram illustrating a determination method of a movement direction after entry to the geofence.

With reference to FIG. 32, a method for determining a movement direction after entry.

After the control unit 101 detects that a user enters a geofence from a predetermined entry direction, the control unit 101 further receives successive GPS measurement values (at least two measurement values) across a GPS measurement interval. In this way, a movement direction of the user after the user enters the geofence can be determined.

For example, as illustrated in FIG. 32, when a position P1 and a position P2 of the user are measured at the measurement interval of the GPS, and a next position P3 is further detected in the geofence GF, the control unit 101 of the server 10 provides a sound service to a user terminal. In other words, when the user stays in the geofence GF for equal to or longer than a predetermined time (approximately 2 seconds in the present example), the control unit 101 of the server 10 provides a sound service.

On the other hand, when a position P4 and a position P5 of the user are measured by the GPS, and a next position P6 is further detected outside the geofence GF, the control unit

101 of the server 10 does not provide a sound service to the user terminal. In this way, when a position of the user terminal temporarily enters the geofence by mistake, the control unit 101 of the server 10 can prevent a content from being distributed to the user terminal.

Note that, in the example described above, measurement values at two points are measured when a movement direction after entry is determined, but a content may be reproduced after three points or more in a geofence are measured. Further, an interval from immediately after a determination until a point in time of a start of a sound output can be appropriately adjusted according to a distance between a geofence and a target facility and a reproduction time of a content. As described above, the information provision control unit 1017 may determine that a user enters a region (geofence) after a lapse of a predetermined time after the user enters the region. Alternatively, the information provision control unit 1017 may determine that a user enters a region (geofence) after the user further travels, by a predetermined distance, from an entry position on a boundary of the region after the user enters the region.

Figure 33:
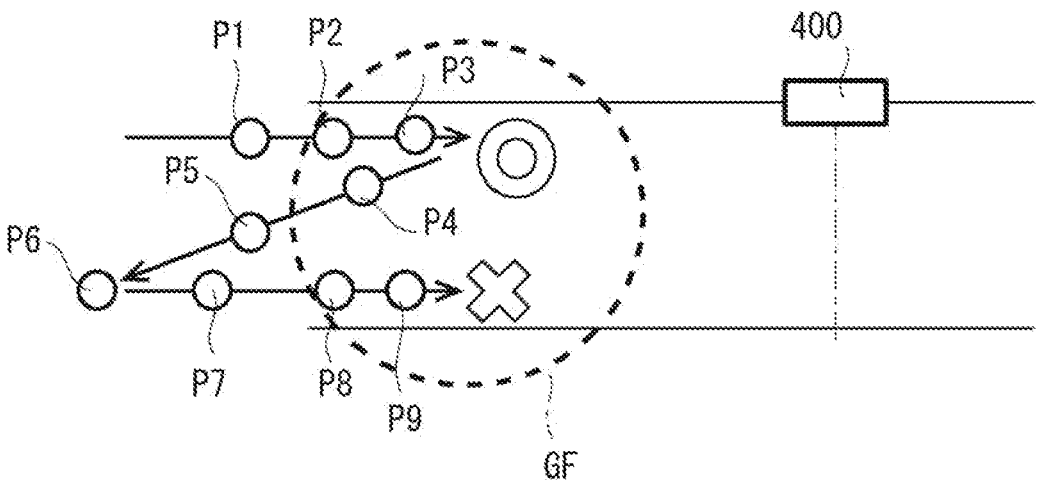
FIG. 33 is a diagram illustrating an example of not distributing a content at a time of re-entry to the geofence.

Furthermore, a content distributed once to a user who enters a geofence may not be distributed to the same user even when the same user enters the geofence again. Specifically, as illustrated in FIG. 33, after a position P1 outside a geofence and a position P2 and a position P3 in the geofence are measured, a content being associated with the facility 400 is reproduced. Subsequently, it is assumed that a user moves to positions P5, P6, and P7 outside the geofence through a position P4 in the geofence, and moves to positions P8 and P9 in the geofence again. In this case, an information provision device can prevent the same content from being distributed again to the user to which the content is distributed once within a predetermined time.

The control unit 101 of the server 10 can store, as history information, provided content information in association with user identification information and geofence identification information in a history information database 1027 of the storage unit 102.

Specifically, reproduction presence/absence flag is provided for acoustic AR sound information (content information). In the information provision device (a user terminal or a server on a cloud side), a reproduced flag predetermined time (for example, an hour) is set for acoustic AR sound information being output from the user terminal. The information provision device confirms a user ID or a terminal ID when a user enters a geofence, and also confirms presence or absence of a flag of acoustic AR sound information being associated with a geofence ID. Then, in a case of presence of the flag, the information provision device does not reproduce a content for the same user terminal, and, in a case of absence of the flag, the information provision device reproduces a content for the same user terminal. In this way, the storage unit 102 can further store history information about a user terminal group and presence/absence of transmission of information about a target object, and the control unit 101 can transmit information about a moving body or a target object to the user terminal 20, based on the history information. The storage unit 102 can further store a transmission time of the information about the moving body or the target object, and the control unit can transmit the information about the moving body or the target object, based on the transmission time.

Further, the information provision control unit 1017 of the server 10 may change a classification of a content being associated with the same geofence, based on history information about a passage path of a user. In this case, regardless of presence or absence of reproduction of the content, the content is changed based on the history information about the passage path of the user indicating which path the user has passed.

The server 10 further includes a history information storage unit (history information database 1027) that stores, as history information about a passage path of a user, identification information about a user terminal, identification information about a plurality of regions, and positional information about the user terminal in the plurality of regions in association with one another, and the information provision control unit 1017 changes content information, based on the history information. FIG. 34 is a diagram illustrating an example of changing a classification of a content being associated with the same geofence. For example, as illustrated in FIG. 34, the information provision control unit 1017 of the server 10 may provide a content A when a user passes through the geofence GF1 in advance and then enters the geofence GF3. On the other hand, the control unit 101 of the server 10 may provide a content B when a user passes through the geofence GF2 in advance and then enters the geofence GF3. In this way, by storing a geofence passed in the past as history information, a content service can be more flexibly provided to a user.

Further, the information provision control unit 1017 of the server 10 may change a classification of a content being associated with the same geofence, based on history information about a passage path of a user and a provided content.

The server 10 further includes a history information storage unit (history information database 1027) that stores, as history information about a passage path of a user and a provided content, identification information about a user terminal, identification information about a plurality of regions, positional information about the user terminal in the plurality of regions, and content information being provided in relation to the plurality of regions, in association with one another. The information provision control unit 1017 changes content information, based on the history information in the history information storage unit.

Figure 35:
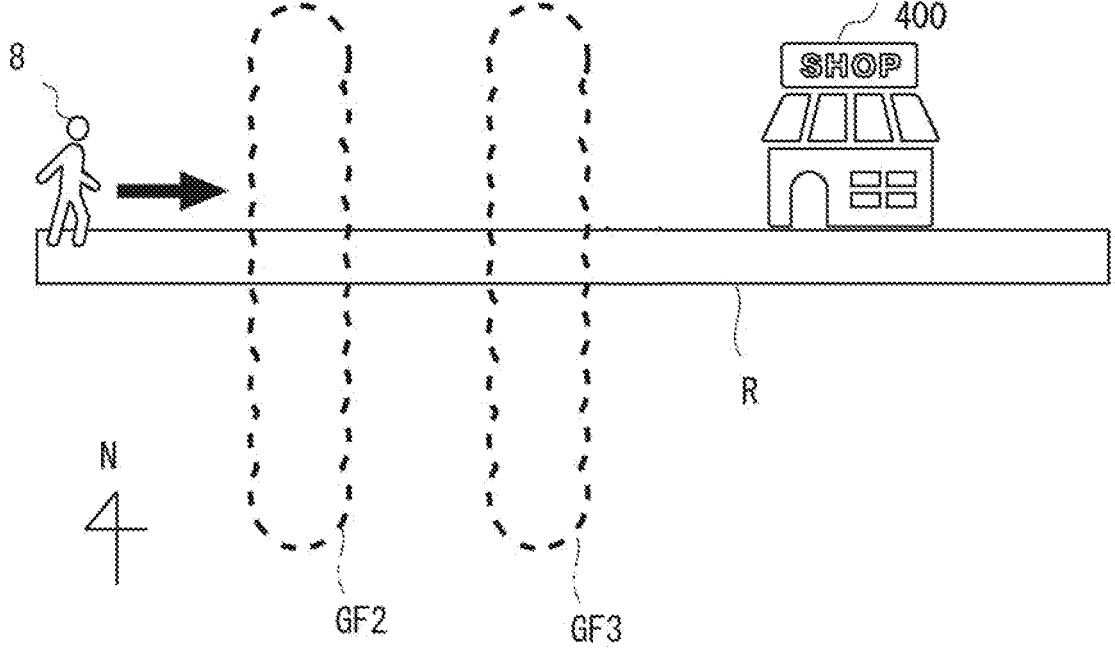
FIG. 35 is a diagram illustrating an example of a plurality of geofences being associated with a facility.

FIG. 35 is a diagram illustrating an example of a plurality of geofences being associated with a facility. FIG. 36 is a diagram illustrating an example of changing a classification of a content being associated with the same geofence.

In FIG. 35, the plurality of geofences GF2 and GF3 are disposed at a predetermined interval on a path of a user 8 to the facility 400. For example, as illustrated in FIG. 36, the information provision control unit 1017 of the server 10 may provide a content C when the user enters the geofence GF2 in advance outside an angle threshold value, passes through the geofence GF2 without being provided with a content being associated with the geofence GF2, and then enters the geofence GF3 in the angle threshold value. On the other hand, the information provision control unit 1017 of the server 10 may provide a content D when the user enters the geofence GF2 in advance in the angle threshold value, is provided with the content being associated with the geofence GF2, passes through the geofence GF2, and then enters the geofence GF3 in the angle threshold value. For example, the content C can be a more substantial content related to a target object than the content D. In this way, by storing, as history information, a geofence passed in the past and presence or absence of reproduction of a content being associated with the geofence, a content service can be more flexibly provided to a user.

Other Example Embodiment

Figure 37:
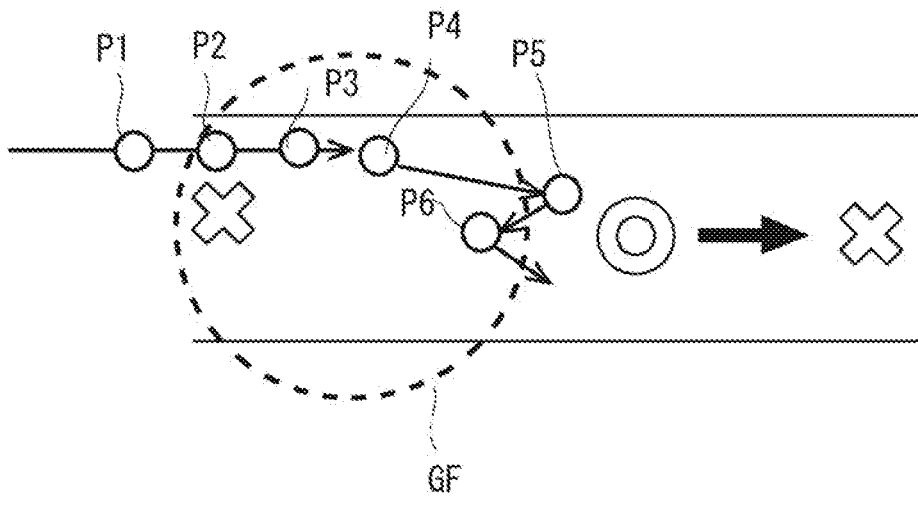
FIG. 37 is a diagram illustrating a problem when a user passes through the geofence and exits.

FIG. 37 is a diagram illustrating a problem when a user passes through a geofence and exits.

When a user enters the geofence GF from the outside of an entry angle threshold value being set for the geofence GF, the information provision control unit 1017 does not provide content information. When the user travels through the geofence GF and exits from the inside to the outside of the geofence, a malfunction due to false detection occurs. For example, when the user stops at a signal or the like near an exit position (for example, a position P5 in FIG. 37) of the geofence, positional information about a user terminal is considered to enter the geofence in the entry angle threshold value due to a GPS error, a totter of the user, and the like, and content information is unnecessarily provided to the user. In order to solve such false detection, even when the user enters the geofence from the outside of the angle threshold value and enters the inside the angle threshold value again, the information provision control unit 1017 does not provide a content as long as it is within a predetermined time since first entry. The predetermined time herein can be freely set in consideration of an average walking speed of the user and a size of the geofence. In this way, the information provision control unit 1017 can ignore the case as illustrated in FIG. 37 within the predetermined time.

Figure 38:
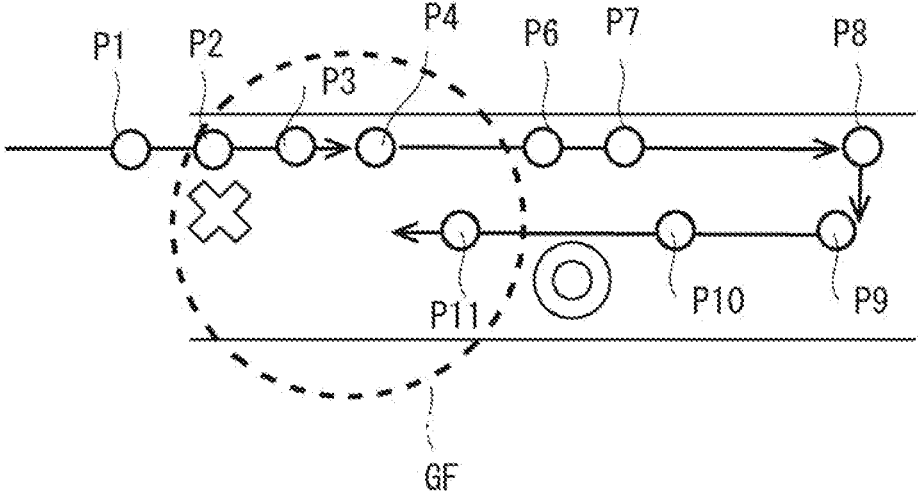
FIG. 38 is a diagram illustrating a coping method when a user passes through the geofence and exits.

FIG. 38 is a diagram illustrating a coping method when a user passes through a geofence.

When a user exits from a geofence, and a position of the user is detected at a plurality of places (for example, P6, P7, P8) outside the geofence, the information provision control unit 1017 may determine that the user exits from the geofence. Subsequently, when the user changes a direction, continues to walk, and enters the geofence in the entry angle threshold value (position P11 in FIG. 38), the information provision control unit 1017 may provide a content. As described above, the information provision control unit 1017 may determine that a user exits from a region (geofence) after a lapse of a predetermined time after the user exits from the region. Alternatively, the information provision control unit 1017 may determine that a user exits from a region (geofence) after the user further travels, by a predetermined distance, from an exit position on a boundary of the region after the user exits from the region.

In the example described above, the program can be stored and provided to a computer using any type of non-transitory computer readable media. Non-transitory computer readable media include any type of tangible storage media. Examples of non-transitory computer readable media include magnetic storage media (such as floppy disks, magnetic tapes, hard disk drives, etc.), optical magnetic storage media (e.g., magneto-optical disks), CD-ROM (compact disc read only memory), CD-R (compact disc recordable), CD-R/W (compact disc rewritable), Blu-ray (registered trademark) Disc (BD), and semiconductor memories (such as mask ROM, PROM (programmable ROM), EPROM (erasable PROM), flash ROM, RAM (random access memory), etc.). The program may be provided to a computer using any type of transitory computer readable media. Examples of transitory computer readable media include electric signals, optical signals, and electromagnetic waves. Transitory computer readable media can provide the program to a computer via a wired communication line (e.g., electric wires, and optical fibers) or a wireless communication line.

Note that the present disclosure is not limited to the example embodiments described above, and may be appropriately modified without departing from the scope of the present disclosure. The plurality of example embodiments described above can be freely combined. For example, in the sound service described above, acoustic AR sound information in which a sound localization position is set in a position of a moving body or a target object can also be output by using a sound localization technique. In general, in the acoustic AR sound information, sound information processed based on a user position with respect to a moving body or a target object is output to a hearable device possessed by a user. In the information provision system according to the present example embodiment, a positional relationship between a user position and a target object is substantially the same when entry to a geofence is detected, and thus acoustic AR sound information that has been already processed in advance based on a geofence position without being processed based on positional information about the user can be output as it is to a user terminal.

A part or the whole of the example embodiments described above can be described as, but not limited to, the following supplementary notes.

(Supplementary Note 1)

An information provision device comprising:

a moving body position acquisition unit configured to acquire positional information about a moving body being movable;

a region setting unit configured to set one or more regions for providing information about the moving body to a user terminal, based on a position of the moving body;

a terminal position acquisition unit configured to acquire positional information about a user terminal being movable; and an information provision control unit configured to control whether to provide information about the moving body being associated with the region to the user terminal, based on a positional relationship between the acquired positional information about the user terminal and the set region.

(Supplementary Note 2)

The information provision device according to claim 1, further comprising a moving body state acquisition unit configured to acquire a state of a moving body including a movement direction and a movement speed of the moving body, wherein the region setting unit sets a different region for providing information about the moving body to a user terminal according to a position, a movement direction, and a movement speed of the moving body.

(Supplementary Note 3)

The information provision device according to claim 2, wherein the region setting unit sets a region in a position having a different distance from the moving body according to a movement direction and a movement speed of the moving body.

(Supplementary Note 4)

The information provision device according to claim 2, wherein the region setting unit sets a region in a position farther from the moving body as a movement speed of the moving body is faster.

(Supplementary Note 5)

The information provision device according to claim 2, wherein the region setting unit sets a region having a different size according to a movement speed of the moving body.

(Supplementary Note 6)

The information provision device according to claim 2, wherein the region setting unit sets one or more regions in a different arrangement with respect to a traveling direction of the moving body according to a movement speed of the moving body.

(Supplementary Note 7)

The information provision device according to claim 2, wherein the region setting unit sets a different number of regions according to a movement speed of the moving body.

(Supplementary Note 8)

The information provision device according to claim 2, wherein the region setting unit sets a greater number of regions as a movement speed of the moving body is slower.

(Supplementary Note 9)

The information provision device according to claim 2, wherein the region setting unit sets a region when the moving body stops to be different from a region when the moving body is traveling.

(Supplementary Note 10)

The information provision device according to claim 1, wherein the information provision control unit provides a different piece of information to the user terminal according to a movement speed of the moving body.

(Supplementary Note 11)

The information provision device according to claim 2, further comprising:

an entry determination unit configured to determine whether a user enters the set region, based on positional information about the user terminal; and a relative angle calculation unit configured to calculate an angle of the moving body with respect to a traveling direction of a user when a user enters the set region, wherein the information provision control unit provides a different piece of information to the user terminal according to a calculated angle of a moving body with respect to a traveling direction of the user.

(Supplementary Note 12)

The information provision device according to claim 11, wherein the information provision control unit provides right, front, and left sound content information to the user terminal according to a calculated angle of the moving body with respect to a traveling direction of the user.

(Supplementary Note 13)

The information provision device according to claim 2, further comprising a storage unit configured to store identification information about the region, identification information and speed information about the moving body, identification information about the user terminal, and information for being provided to the user terminal in association with one another.

(Supplementary Note 14)

The information provision device according to claim 1, wherein the region setting unit sets at least a region that does not include the moving body in a position away from the moving body.

(Supplementary Note 15)

An information provision system comprising:

a moving body position acquisition unit configured to acquire positional information about a moving body being movable;

a region setting unit configured to set one or more regions for providing information about the moving body to a user terminal, based on a position of the moving body;

a terminal position acquisition unit configured to acquire positional information about a user terminal being movable; and an information provision control unit configured to control whether to provide information about the moving body being associated with the region to the user terminal, based on a positional relationship between the acquired positional information about the user terminal and the set region.

(Supplementary Note 16)

An information provision method comprises:

acquiring positional information about a moving body being movable;

setting one or more regions for providing information about the moving body to a user terminal, based on a position of the moving body;

acquiring positional information about a user terminal being movable; and controlling whether to provide information about the moving body being associated with the region to the user terminal, based on a positional relationship between the acquired positional information about the user terminal and the set region.

(Supplementary Note 17)

A non-transitory computer readable medium storing a program causing a computer to execute:

acquiring positional information about a moving body being movable;

setting one or more regions for providing information about the moving body to a user terminal, based on a position of the moving body;

acquiring positional information about a user terminal being movable; and controlling whether to provide information about the moving body being associated with the region to the user terminal, based on a positional relationship between the acquired positional information about the user terminal and the set region.

The present disclosure is able to provide an information provision device, an information provision system, an information provision method, a program, and the like that are able to appropriately set a region for providing information about a moving body to a user, and appropriately provide information to a user who enters or exits from the set region.

The first, second and third embodiments can be combined as desirable by one of ordinary skill in the art.

While the disclosure has been particularly shown and described with reference to embodiments thereof, the disclosure is not limited to these embodiments. It will be understood by those of ordinary skill in the art that various changes in form and details may be made therein without departing from the spirit and scope of the present disclosure as defined by the claims.

What is claimed is:

1. An information provision device comprising:

at least one memory storing instructions, and at least one processor configured to execute the instructions to:

acquire first positional information of a moving body;

acquire second positional information of a user;

obtain positional relationship information corresponding to an angle of the moving body with respect to a traveling direction of the user based on the first positional information and the second positional information; and based on a distance between the moving body and the user satisfying a first criteria, control to provide a first notification based on the positional relationship information in a case in which the angle of the moving body with respect to the traveling direction of the user is a first angle, and provide a second notification based on the positional relationship information in a case in which the angle of the moving body with respect to the traveling direction of the user is a second angle.

2. The information provision device according to claim 1, wherein the at least one processor is further configured to execute the instructions to:

acquire a state of the moving body including a movement direction and a movement speed of the moving body; and obtain the positional relationship information further based on the state of the moving body.

3. The information provision device according to claim 1, wherein at least one of the first notification and the second notification comprises content information, and wherein the content information varies based on a type of the moving body.

4. The information provision device according to claim 1, wherein at least one of the first notification and the second notification comprises content information, and wherein the content information comprises integrated information comprising both visual and audio components.

5. The information provision device according to claim 1, wherein at least one of the first notification and the second notification comprises audio content information, and wherein the at least one processor is configured to execute the instructions to control to output the audio content corresponding to a right ear and a left ear based on an angle between the user and the moving body.

6. The information provision device according to claim 1, wherein at least one of the first notification and the second notification comprises visual content information, and wherein the visual content information comprises an icon image related to the moving body.

7. The information provision device according to claim 1, wherein the moving body is a vehicle.

8. The information provision device according to claim 1, wherein the second positional information of the user is acquired based on information obtained from a user terminal.

9. An information provision method comprising:

acquiring first positional information of a moving body;

acquiring second positional information of a user;

obtaining positional relationship information corresponding to an angle of the moving body with respect to a traveling direction of the user based on the first positional information and the second positional information; and based on a distance between the moving body and the user satisfying a first criteria, controlling to provide a first notification based on the positional relationship information in a case in which the angle of the moving body with respect to the traveling direction of the user is a first angle, and provide a second notification based on the positional relationship information in a case in which the angle of the moving body with respect to the traveling direction of the user is a second angle.

10. The information provision method according to claim 9, further comprising: acquiring a state of the moving body including a movement direction and a movement speed of the moving body; and obtaining the positional relationship information further based on the state of the moving body.

11. The information provision method according to claim 9, wherein at least one of the first notification and the second notification comprises content information, and wherein the content information varies based on a type of the moving body.

12. The information provision method according to claim 9, wherein at least one of the first notification and the second notification comprises content information, and wherein the content information comprises integrated information comprising both visual and audio components.

13. The information provision method according to claim 9, wherein at least one of the first notification and the second notification comprises audio content information, and wherein the information provision method further comprises controlling to output the audio content corresponding to a right ear and a left ear based on an angle between the user and the moving body.

14. The information provision method according to claim 9, wherein at least one of the first notification and the second notification comprises video content information, and wherein the video content information comprises an icon image related to the moving body.

15. The information provision method according to claim 9, wherein the moving body is a vehicle.

16. The information provision method according to claim 9, wherein the second positional information of the user is acquired based on information obtained from a user terminal.

17. A non-transitory computer readable medium storing a program causing a computer to execute:

acquiring first positional information of a moving body;

acquiring second positional information of a user;

obtaining positional relationship information corresponding to an angle of the moving body with respect to a traveling direction of the user based on the first positional information and the second positional information; and based on a distance between the moving body and the user satisfying a first criteria, controlling to provide a first notification based on the positional relationship information in a case in which the angle of the moving body with respect to the traveling direction of the user is a first angle, and provide a second notification based on the positional relationship information in a case in which the angle of the moving body with respect to the traveling direction of the user is a second angle.

* * * * *